United States Patent
Gyota

(10) Patent No.: US 11,422,539 B2
(45) Date of Patent: Aug. 23, 2022

(54) CONTROL SYSTEM, CONTROL METHOD, AND PROGRAM

(71) Applicant: Mitsubishi Electric Corporation, Tokyo (JP)

(72) Inventor: Tomoaki Gyota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 47 days.

(21) Appl. No.: 16/958,337

(22) PCT Filed: Jan. 29, 2018

(86) PCT No.: PCT/JP2018/002668
§ 371 (c)(1),
(2) Date: Jun. 26, 2020

(87) PCT Pub. No.: WO2019/146098
PCT Pub. Date: Aug. 1, 2019

(65) Prior Publication Data
US 2021/0064011 A1    Mar. 4, 2021

(51) Int. Cl.
*H04L 29/08* (2006.01)
*G05B 19/418* (2006.01)
(Continued)

(52) U.S. Cl.
CPC ......... *G05B 19/4185* (2013.01); *G05B 15/02* (2013.01); *G05B 19/4183* (2013.01); *H04L 67/12* (2013.01)

(58) Field of Classification Search
CPC ............................ G05B 19/4185; G05B 15/02; G05B 19/4183; H04L 67/12; H04Q 9/00
See application file for complete search history.

(56) References Cited

U.S. PATENT DOCUMENTS

2014/0012427 A1*  1/2014  Katayama ......... H02J 13/00034
                                                    700/291
2014/0185444 A1   7/2014  Inoue et al.

FOREIGN PATENT DOCUMENTS

JP    2005-311869 A    11/2005
JP    2013-222293 A    10/2013
(Continued)

OTHER PUBLICATIONS

Office Action dated May 25, 2021 issued in the corresponding JP patent application No. 2019-567805 (and the English translation).
(Continued)

*Primary Examiner* — Kim T Nguyen
(74) *Attorney, Agent, or Firm* — Posz Law Group, PLC

(57) ABSTRACT

A control system includes a controller that executes, a first control process including acquiring data indicating a state of the facility device, and performing an operation for control of the state of the facility device based on the acquired data, and a second control process including the acquisition and operational processes, in which an amount of processing is less than that of the first control process. The control system also includes a switch that performs, a control to maintain or switch a state of the first control process to the stop state, and switch a state of the second control process to an execution state, and a control to switch a state of one of the first and second control processes to the execution state, based on predicted amounts of decrease in an electric power cost of and increase in the operation cost.

10 Claims, 27 Drawing Sheets

(51) Int. Cl.
*G05B 15/02* (2006.01)
*H04L 67/12* (2022.01)

(56) References Cited

FOREIGN PATENT DOCUMENTS

JP          2014-121074 A          6/2014
JP          2014-127969 A          7/2014

OTHER PUBLICATIONS

Extended European Search Report dated Oct. 27, 2020 in the corresponding EP application No. 18902331.0.
International Search Report dated Apr. 17, 2018 issued in the corresponding International Application No. PCT/JP2018/002668(and English translation).
Office Action dated Mar. 22, 2022 issued in corresponding European patent application No. 18902331.0.

* cited by examiner

FIG.12

| SUPPRESSING CONDITION | BEFORE SATISFACTION | AFTER SATISFACTION |
|---|---|---|
| CONTROL MODE | FIRST CONTROL MODE | SECOND CONTROL MODE |
| APPLICATION | FIRST APPLICATION | SECOND APPLICATION |
| CONTROL PROCESS | FIRST CONTROL PROCESS | SECOND CONTROL PROCESS |
| TYPES OF ACQUIRED DATA | USER IDS IN EACH AIR-CONDITIONED SPACE, AND SITUATION OF EACH USER | TOTAL NUMBER OF USERS AT EACH FLOOR |
| | INLET TEMPERATURE, REFRIGERANT PIPE TEMPERATURE, AND TARGET TEMPERATURE OF EACH AIR CONDITIONER | INLET TEMPERATURE, REFRIGERANT PIPE TEMPERATURE, AND TARGET TEMPERATURE OF EACH AIR CONDITIONER |
| | ELECTRIC POWER CONSUMPTION OF EACH AIR CONDITIONER | ELECTRIC POWER CONSUMPTION OF EACH AIR CONDITIONER |
| OPERATION | USER-DISTRIBUTION REFLECTED CONTROL OPERATION | INTERNAL-LOAD PROPORTIONAL CONTROL OPERATION |

FIG.16

| SUPPRESSING CONDITION | BEFORE SATISFACTION | AFTER SATISFACTION |
|---|---|---|
| CONTROL MODE | FIRST CONTROL MODE | SECOND CONTROL MODE |
| APPLICATION | FIRST APPLICATION | SECOND APPLICATION |
| CONTROL PROCESS | FIRST CONTROL PROCESS | SECOND CONTROL PROCESS |
| TYPES OF ACQUIRED DATA | TOTAL NUMBER OF USERS IN EACH AIR-CONDITIONED SPACE | — |
| | INLET TEMPERATURE, REFRIGERANT PIPE TEMPERATURE, AND TARGET TEMPERATURE OF EACH AIR CONDITIONER | INLET TEMPERATURE, REFRIGERANT PIPE TEMPERATURE, AND TARGET TEMPERATURE OF EACH AIR CONDITIONER |
| | ELECTRIC POWER CONSUMPTION OF EACH AIR CONDITIONER | ELECTRIC POWER CONSUMPTION OF EACH AIR CONDITIONER |
| OPERATION | SELECTIVE DEMAND CONTROL | UNIFORM DEMAND CONTROL |

FIG.18

| SUPPRESSING CONDITION | BEFORE SATISFACTION | AFTER SATISFACTION |
|---|---|---|
| CONTROL MODE | FIRST CONTROL MODE | SECOND CONTROL MODE |
| APPLICATION | FIRST APPLICATION | SECOND APPLICATION |
| CONTROL PROCESS | FIRST CONTROL PROCESS | SECOND CONTROL PROCESS |
| TYPES OF ACQUIRED DATA | USER IDS IN EACH AIR-CONDITIONED SPACE, AND SITUATION OF EACH USER | USER IDS IN EACH AIR-CONDITIONED SPACE, AND SITUATION OF EACH USER |
| | INLET TEMPERATURE, REFRIGERANT PIPE TEMPERATURE, AND TARGET TEMPERATURE OF EACH AIR CONDITIONER | INLET TEMPERATURE, REFRIGERANT PIPE TEMPERATURE, AND TARGET TEMPERATURE OF EACH AIR CONDITIONER |
| | ELECTRIC POWER CONSUMPTION OF EACH AIR CONDITIONER | ELECTRIC POWER CONSUMPTION OF EACH AIR CONDITIONER |
| OPERATION | WHOLE-AREA AUTOMATIC CONTROL OPERATION | LIMITED-AREA AUTOMATIC CONTROL OPERATION |

CONTROL SYSTEM, CONTROL METHOD, AND PROGRAM

CROSS REFERENCE TO RELATED APPLICATION

This application is a U.S. national stage application of PCT/JP2018/002668 filed on Jan. 29, 2018, the contents of which are incorporated herein by reference.

TECHNICAL FIELD

The present disclosure relates to a control system, a control method, and a program.

BACKGROUND ART

A system has been known which includes a first device that transmits data at certain intervals and a second device that transmits a reply containing processing time information indicating the time required for processing of the received data. When the first device in this system receives the processing time information from the second device, the first device adjusts the length of the data based on the received processing time information, and transmits the data having the adjusted length to the second device at certain intervals (for example, refer to Patent Literature 1).

CITATION LIST

Patent Literature

Patent Literature 1: Unexamined Japanese Patent Application Publication No. 2014-127969

SUMMARY OF INVENTION

Technical Problem

However, the system disclosed in Patent Literature 1 can adjust the data length, thereby varying the amount of data to be transmitted at a time but cannot vary the total amount of data to be transmitted. That is, the system can only reduce the maximum amount of processing per unit time in the second device that receives the data, and cannot suppress an increase in the total amount of processing.

Especially in the case where the second device that is data destination is a cloud server achieved by physically multiple servers that function as a virtually single server, this system can increase the number of servers that function as a single cloud server in response to an increase in the amount of data received per unit time, and thus increase the amount of data processable per unit time. However, there has been a problem that the system disclosed in Patent Literature 1 cannot suppress an increase in the operation cost of the system when the total amount of received data increases, because the operation cost of the cloud server depends on the total amount of data processing.

Furthermore, even when the cloud server receives a large amount of data from a malicious third party, the cloud server must continue to provide services, such as control of facility devices, and thus cannot stop the reception or processing of data. The system disclosed in Patent Literature 1 is therefore vulnerable so that the operational cost of the system may be manipulated by the third party.

In view of the above circumstances, an objective of the disclosure is to provide a control system, a control method, and a program that can suppress an increase in the operation cost and continue the control of facility devices and are less vulnerable than conventional ones.

Solution to Problem

In order to achieve the above objective, a control system for controlling a facility device according to one aspect of the disclosure includes control means and switching means. The control means executes, in a cloud server, a first control process including an acquisition process for acquiring data indicating a state of the facility device, and an operational process for performing an operation for controlling the state of the facility device based on the data acquired in the acquisition process, and a second control process including the acquisition process and the operational process, in which an amount of processing necessary for execution of the second control process is less than that of the first control process. The switching means performs, when a condition for suppressing an increase in an operation cost of the control system is satisfied, one control of a control to maintain a stop state of the first control process or switch a state of the first control process to the stop state, and switch a state of the second control process to an execution state, and a control to switch a state of at least one control process to the execution state, which is selected from the first control process and the second control process based on predicted amounts of decrease in an electric power cost achievable by control of the facility device and predicted amounts of increase in the operation cost.

Advantageous Effects of Invention

The control system, the control method, and the program according to the disclosure can suppress an increase in the operation cost and continue the control of facility devices and are less vulnerable than conventional ones.

BRIEF DESCRIPTION OF DRAWINGS

FIG. 12 is a drawing illustrating exemplary control modes according to Embodiment 1;

FIG. 16 is a drawing illustrating exemplary control modes according to Embodiment 3;

FIG. 18 is a drawing illustrating exemplary control modes according to Embodiment 4;

DESCRIPTION OF EMBODIMENTS

Embodiment 1

A control system 1 according to Embodiment 1 of the disclosure will be described hereinafter with reference to the accompanying drawings.

Figure 1:
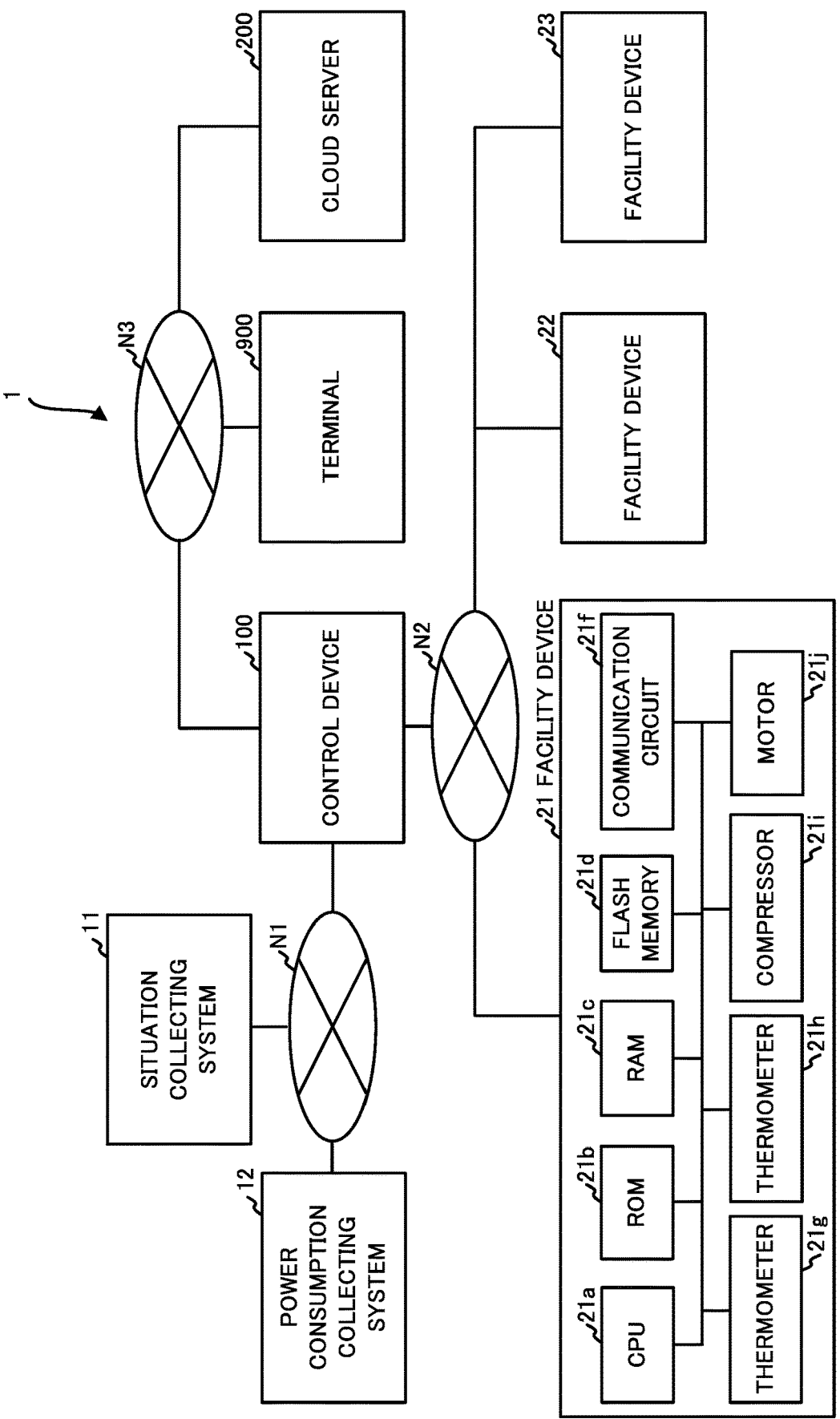
FIG. 1 is a drawing illustrating an exemplary configuration of a control system according to Embodiment 1 of the disclosure.

A control system 1 illustrated in FIG. 1 is installed, for example, in an office building that has multiple floors. The control system 1 includes a situation collecting system 11 for collecting situation data indicating the situations of users staying in the office building, and a power consumption collecting system 12 for collecting data indicating electric power consumptions of facility devices 21 to 23 installed in spaces where the users stay.

The control system 1 also includes the facility devices 21 to 23, which are air-conditioning devices (hereinafter referred to as "air conditioners") for conditioning the air in the spaces where the users stay, and a control device 100 for controlling the facility devices 21 to 23.

The control system 1 further includes a cloud server 200 for executing applications to provide the control device 100 with an instruction on control contents, based on the data collected by the situation collecting system 11 and the power consumption collecting system 12, and a terminal 900 for monitoring execution states of the applications.

Figure 2:
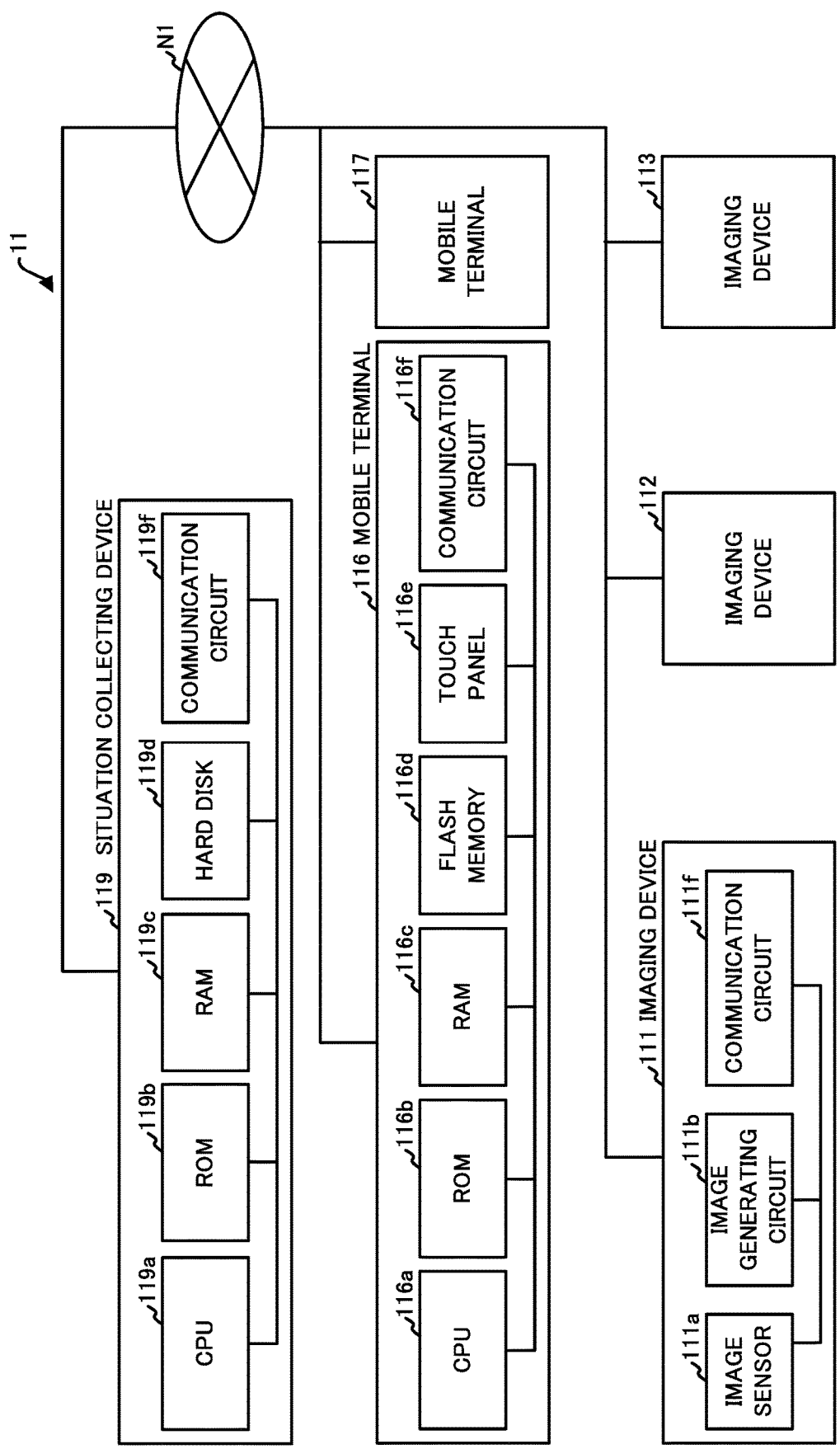
FIG. 2 is a drawing illustrating an exemplary configuration of a situation collecting system.

As shown in FIG. 2, the situation collecting system 11 includes imaging devices 111 to 113 for taking images of the spaces (hereinafter referred to as "air-conditioned spaces") in which the air is conditioned by the facility devices 21 to 23. The situation collecting system 11 also includes mobile terminals 116 and 117 carried by users for executing an application that is used to input a requirement of the users regarding the air-conditioned spaces.

The situation collecting system 11 further includes a situation collecting device 119 for collecting the situation data indicating the situations of the users, based on image data indicating the images taken by the imaging devices 111 to 113 and requirement data indicating the requirements input at the mobile terminals 116 and 117. The situation collecting device 119 is further connected to the control device 100 illustrated in FIG. 1 via a local network N1, and transmits the situation data to reply to a request from the control device 100.

The imaging device 111 is a digital camera. The imaging device 111 is disposed at the position, such as on the ceiling or wall at the floor, where the imaging device 111 can take an image of the space air-conditioned by the facility device 21. The imaging device 111, for example, an image sensor 111a for performing imaging operations at certain intervals and an image generating circuit 111b for generating an image representing the imaged space after each of the imaging operations by the image sensor 111a. The imaging device 111 is also equipped with a communication circuit 111f. After the generation of the image by the image generating circuit 111b, the communication circuit 111f transmits image data indicating the generated image and camera identification data (ID) for identifying the imaging device 111 to the situation collecting device 119.

The imaging devices 112 and 113 have the configuration and functions identical to those of the imaging device 111. The imaging device 112 is disposed at the position where the imaging device 112 can take an image of the space air-conditioned by the facility device 22 while the imaging device 113 is disposed at the position where the imaging device 113 can take an image of the space air-conditioned by the facility device 23.

The mobile terminal 116 is a cellular phone, for example. The mobile terminal 116 includes a central processing unit (CPU) 116a for executing an input application that is used to input a requirement to lower or raise the temperature or lower the humidity. The CPU 116a also executes a detection application that is used to detect, for example, at certain intervals the floor and location where the mobile terminal 116 is located, for example, based on the strength of radio waves received by a non-illustrated access point included in the local network N1.

The mobile terminal 116 also includes a read only memory (ROM) 116b for storing programs for control of the hardware, and a random access memory (RAM) 116c to be used as a work area during execution of applications and programs. The mobile terminal 116 further includes a flash memory 116d for storing applications and user IDs for identifying users, and a touch panel 116e for inputting a signal corresponding to an operation of a user during execution of an application.

The mobile terminal 116 also includes a communication circuit 116f for transmitting location data or requirement data along with a user ID to the situation collecting device 119 when the floor and location are detected by execution of the application or when a requirement is input. The mobile terminal 117 has the configuration and functions identical to those of the mobile terminal 116.

The situation collecting device 119 includes a CPU 119a, a ROM 119b, and a RAM 119c having the configurations and functions identical to those of the CPU 116a, the ROM 116b, and the RAM 116c of the mobile terminal 116.

The situation collecting device 119 also includes a hard disk 119d for storing the camera ID of the imaging device 111, space data indicating the floor and space imaged by the imaging device 111, and the facility ID for identifying the facility device 21 that air-conditions this space, in association with each other. The hard disk 119d also stores the camera IDs of the imaging devices 112 and 113, the space data regarding the imaging devices 112 and 113, and the facility IDs of the facility devices 22 and 23, in association with each other.

The hard disk 119d further stores a program for specifying the clothing of users based on the image data from the imaging devices 111 to 113.

The situation collecting device 119 further includes a communication circuit 119f for communicating with the imaging devices 111 to 113, the mobile terminals 116 and 117, and the control device 100 via the local network N1.

When the communication circuit 119f receives the image data and the camera ID from the imaging device 111, the CPU 119a of the situation collecting device 119 executes the program stored in the hard disk 119d, thereby analyzing the image data, detecting a user from the image, and specifying the clothing of the detected user.

The CPU 119a then acquires the space data stored in the hard disk 119d in association with the received camera ID of the imaging device 111. The CPU 119a then specifies location data indicating the floor identical to the floor indicated by the acquired space data and indicating the location included in the space indicated by the space data, among location data received from the mobile terminals 116 and 117. The CPU 119a then determines that the user identified by the user ID received along with the specified location data is the user included in the image taken by the imaging device 111, and determines that the clothing specified in the image data from the imaging device 111 is the clothing of this user.

The CPU 119a also specifies the facility ID associated with the acquired space data, in order to identify the facility device that air-conditions the space where the specified user stays.

The CPU 119a then associates the specified facility ID of the facility device, the user ID of the user staying in the space air-conditioned by this facility device, clothing data indicating the clothing of this user, the location data, and the requirement data with each other. The CPU 119a also executes the same processes to the data from the imaging devices 112 and 113 as the above-explained processes to the data from the imaging device 111.

The CPU 119a then counts the number of floors indicated by the pieces of location data, thereby determining the total number of floors in the office building where the control system 1 is installed. The CPU 119a counts the pieces of location data regarding the same floor, thereby determining the total number of users staying at each of the floors. Similarly, the CPU 119a then counts the pieces of space data regarding the same floor, thereby determining the total number of facility devices disposed at each of the floors, and counts the user IDs associated with the pieces of space data indicating the same air-conditioned space, thereby determining the total number of users staying in the air-conditioned space.

Figure 3:
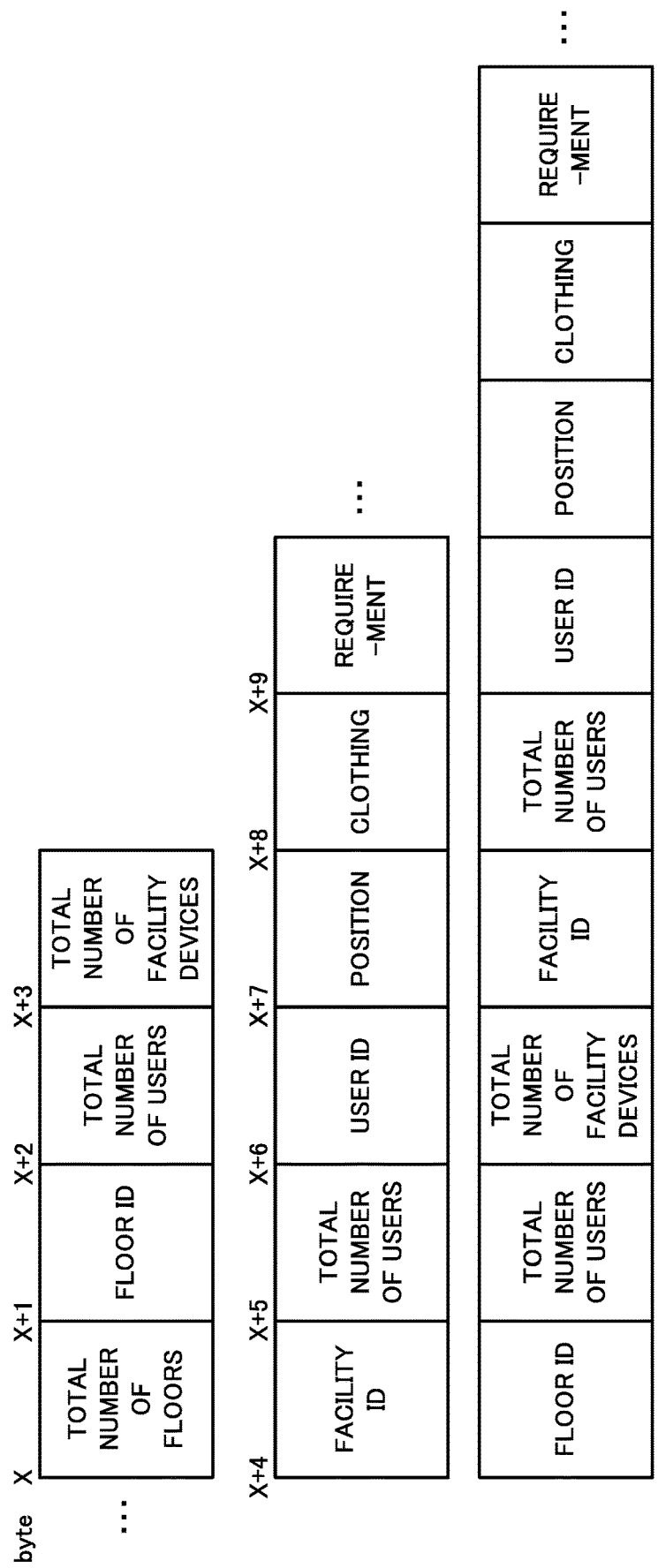
FIG. 3 is a drawing illustrating exemplary situation data transmitted from the situation collecting device.

The CPU 119a then adds data indicating the total number of floors to the end of the header having a predetermined number of bytes, in order to generate situation data in the data format as illustrated in FIG. 3. The CPU 119a then selects one of the specified floors, and adds the floor ID of the selected floor, data indicating the total number of users staying at this floor, and data indicating the total number of facility devices disposed at this floor, to the end of the situation data.

The CPU 119a then selects one of the facility devices at the selected floor, and adds the facility ID of the selected facility device and data indicating the total number of users staying in the space air-conditioned by this facility device, to the end of the situation data. The CPU 119a then selects one of the users staying in the air-conditioned space, and adds the user ID, location data, clothing data, and requirement data on the selected user, to the end of the situation data.

The CPU 119a repeats the process from selection of one of the users to the addition of data on the user, until completion of selection of all the users staying in the air-conditioned space. The CPU 119a then repeats the process from selection of one of the facility devices to the addition of data on the user, until completion of selection of all the facility devices disposed at the selected floor. The CPU 119a then repeats the process from selection of one of the floors to the addition of data on the user, until completion of selection of all the floors. The generation of the situation data is then terminated.

When the communication circuit 119f illustrated in FIG. 2 receives a request from the control device 100, the CPU 119a of the situation collecting device 119 causes the communication circuit 119f to transmit a reply containing the generated situation data.

Figure 4:
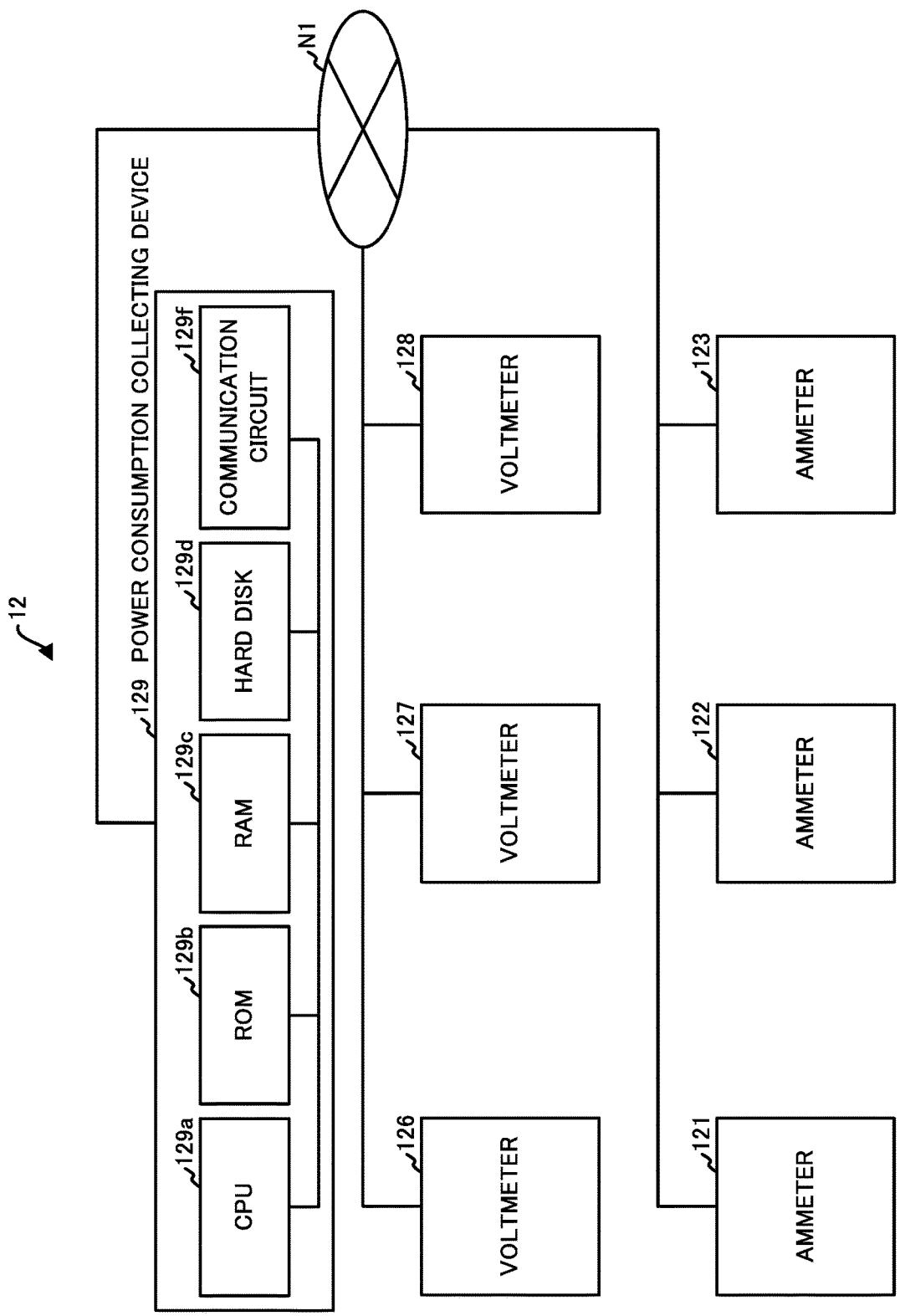
FIG. 4 is a drawing illustrating an exemplary configuration of a power consumption collecting system.

The power consumption collecting system 12 illustrated in FIG. 1 includes ammeters 121 to 123 as illustrated in FIG. 4, which are provided to feeder lines of the facility devices 21 to 23 and measure currents supplied to the facility devices 21 to 23. The power consumption collecting system 12 also includes voltmeters 126 to 128, which are provided to the feeder lines and measure voltages applied to the facility devices 21 to 23.

The power consumption collecting system 12 further includes a power consumption collecting device 129. The power consumption collecting device 129 measures electric power consumptions of the facility devices 21 to 23 by multiplying the currents measured by the ammeters 121 to 123 and the voltages measured by the voltmeters 126 to 128, and collects data indicating the measured electric power consumptions.

The power consumption collecting device 129 a CPU 129a, a ROM 129b, a RAM 129c, a hard disk 129d, and a communication circuit 129f having the configurations and functions identical to those of the CPU 119a, the ROM 119b, the RAM 119c, the hard disk 119d, and the communication circuit 119f of the situation collecting device 119 illustrated in FIG. 2.

When the communication circuit 129f receives a request from the control device 100, the CPU 129a of the power consumption collecting device 129 causes the communication circuit 129f to transmit a reply containing the facility IDs of the facility devices 21 to 23 and power consumption data indicating the electric power consumptions of the facility devices 21 to 23.

The facility device 21 illustrated in FIG. 1 includes a CPU 21a, a ROM 21b, a RAM 21c, and a communication circuit 21f. These components have the configurations and functions identical to those of the CPU 116a, the ROM 116b, the RAM 116c, and the communication circuit 116f of the mobile terminal 116 illustrated in FIG. 2.

The facility device 21, which is an air conditioner, also includes a flash memory 21d for storing target temperature data indicating a target temperature set by a user and the facility ID of the facility device 21.

The facility device 21 further includes a thermometer 21g disposed at an air inlet, for example. The thermometer 21g measures an inlet temperature, which is a temperature of air introduced from the air inlet, and outputs temperature data indicating the measured temperature to the CPU 21a, for example, at certain intervals. The facility device 21 further includes a thermometer 21h disposed inside a refrigerant pipe, for example. The thermometer 21h measures a refrigerant pipe temperature, which is a temperature of a refrigerant, and outputs temperature data indicating the measured temperature to the CPU 21a, for example, at certain intervals.

When the communication circuit 21f receives a request from the control device 100, the CPU 21a of the facility device 21 causes the communication circuit 21f to transmit a reply containing, as operation state data indicating an operation state of the facility device 21, the facility ID and the target temperature data stored in the flash memory 21d and the temperature data from the thermometers 21g and 21h.

The facility device 21 further includes a compressor 21i for compressing a refrigerant and a motor 21j for adjusting the number of rotations of a non-illustrated fan per unit time, which discharges the air heated or cooled by the refrigerant.

When the communication circuit 21f receives a control instruction, which is determined based on the operation state data, from the control device 100, the CPU 21a of the facility device 21 controls the compressor 21i and the motor 21j to cause an operation that achieves the outlet temperature and the volume of output airflow designated by the control instruction. The facility devices 22 and 23 have the configurations and functions identical to those of the facility device 21.

Figure 5:
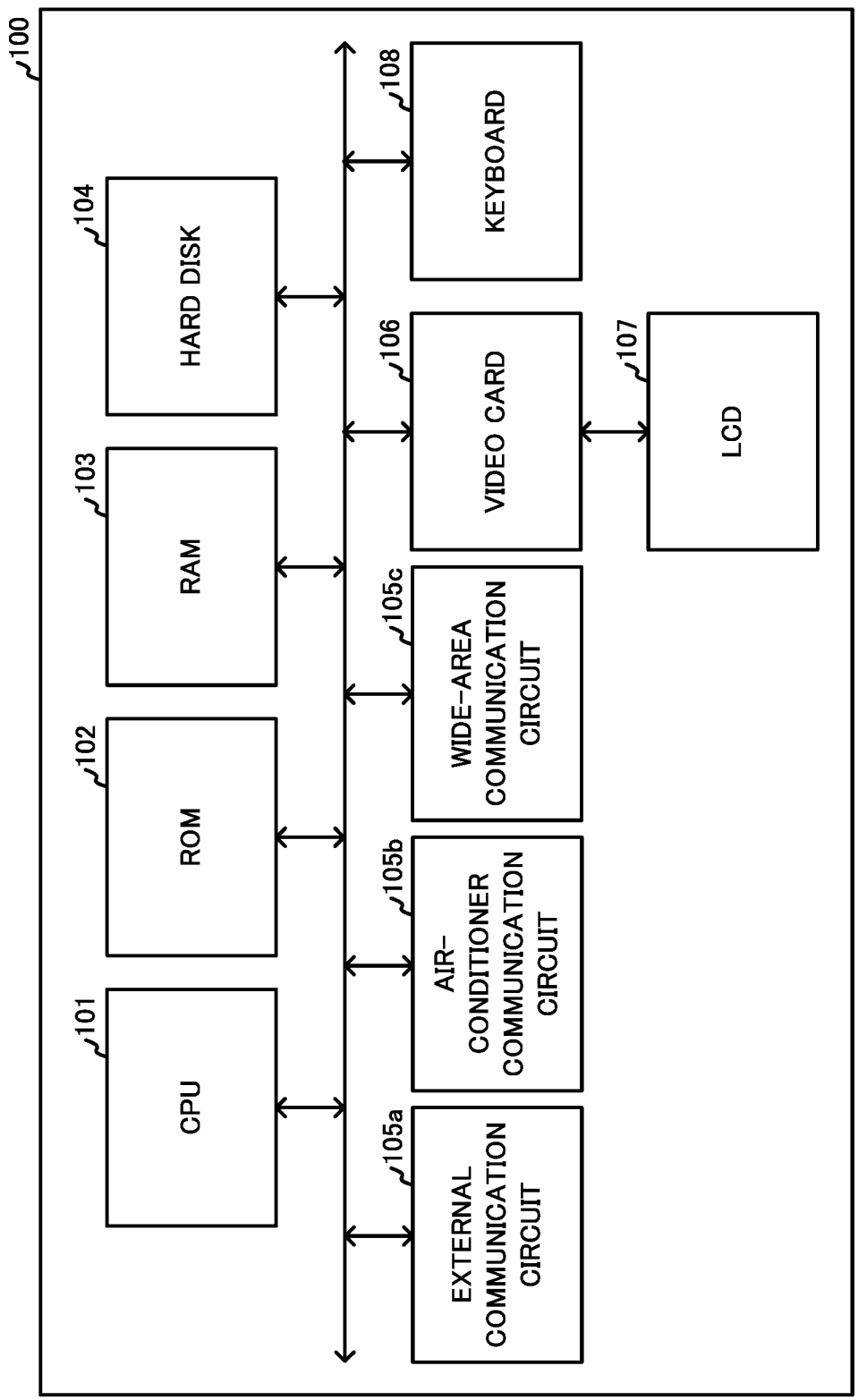
FIG. 5 is a drawing illustrating an exemplary hardware configuration of a control device.

The control device 100 includes a CPU 101, a ROM 102, a RAM 103, and a hard disk 104, as illustrated in FIG. 5. These components have the configurations and functions identical to those of the CPU 119a, the ROM 119b, the RAM 119c, and the hard disk 119d of the situation collecting device 119 illustrated in FIG. 2.

The control device 100 also includes an external communication circuit 105a for communicating with the situation collecting device 119 and the power consumption collecting device 129, which are external devices, via the local network N1 illustrated in FIG. 1. The control device 100 further includes an air-conditioner communication circuit 105b for communicating with the facility devices 21 to 23, which are the air conditioners, via an air-conditioner network N2, and a wide-area communication circuit 105c for communicating with the cloud server 200 and the terminal 900 via a public network N3. The wide-area communication circuit 105c is an example of communication means included in the control device according to the disclosure.

The control device 100 further includes a video card 106 for rendering an image based on a digital signal output from the CPU 101 and outputting an image signal indicating the rendered image, and a liquid crystal display (LCD) 107 for displaying an image in accordance with the image signal output from the video card 106. The control device 100 further includes a keyboard 108 for inputting a signal corresponding to an operation of a user to the CPU 101.

Figure 6:
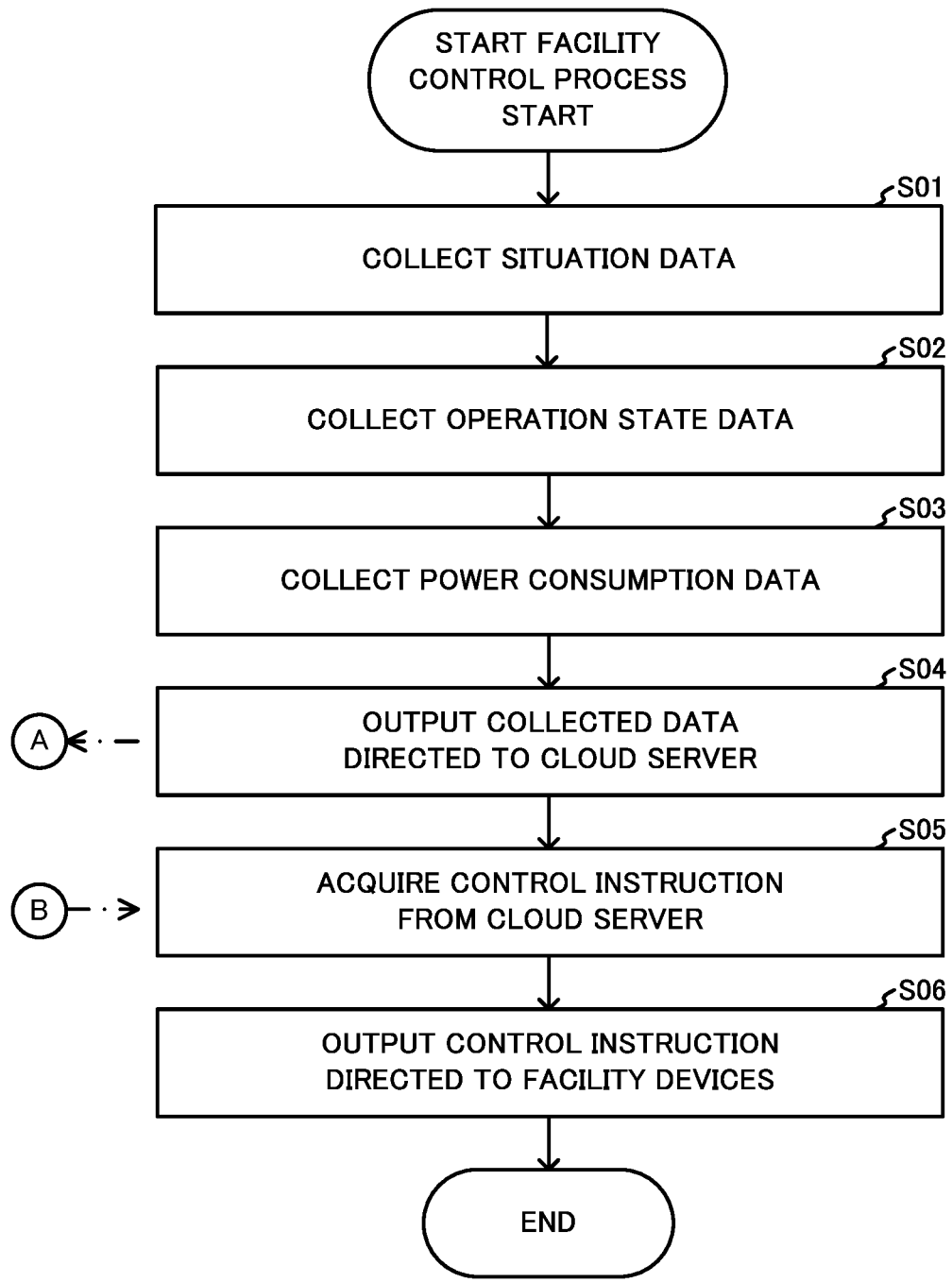
FIG. 6 is a flowchart illustrating an exemplary facility control process executed by the control device according to Embodiment 1.

The CPU 101 of the control device 100 executes a facility control process as illustrated in FIG. 6 for controlling the facility devices 21 to 23, for example, at certain intervals.

Figure 7:
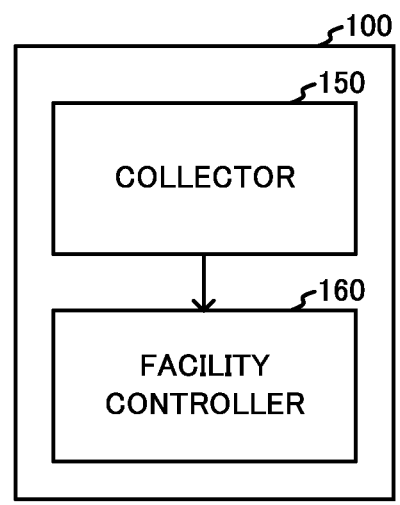
FIG. 7 is a functional block diagram illustrating exemplary functions of the control device according to Embodiment 1.

The CPU 101 thus functions as a collector 150 as illustrated in FIG. 7 for collecting the situation data, the operation state data, and the power consumption data. The collector 150 is an example of collecting means according to the disclosure.

After the data collected by the collector 150 is transmitted by the wide-area communication circuit 105c illustrated in FIG. 5 to the cloud server 200, the CPU 101 functions as a facility controller 160 for controlling the facility devices 21 to 23 in accordance with the control contents determined by the cloud server 200.

At the start of the facility control process illustrated in FIG. 6, the collector 150 illustrated in FIG. 7 outputs to the external communication circuit 105a illustrated in FIG. 5 a request for transmission of situation data that is directed to the situation collecting device 119 of the situation collecting system 11 illustrated in FIG. 2. The external communication circuit 105a transmits the output request to the situation collecting device 119. When the external communication circuit 105a receives the situation data from the situation collecting device 119, the collector 150 acquires the situation data from the external communication circuit 105a (Step S01).

The collector 150 then outputs to the air-conditioner communication circuit 105b a request for transmission of operation state data that is directed to the facility devices 21 to 23. When the air-conditioner communication circuit 105b receives operation state data after transmission of the request, the collector 150 acquires the operation state data from the air-conditioner communication circuit 105b (Step S02).

The collector 150 then outputs to the external communication circuit 105a a request for transmission of power consumption data that is directed to the power consumption collecting device 129 of the power consumption collecting system 12 illustrated in FIG. 4. When the external communication circuit 105a receives the power consumption data, the collector 150 acquires the power consumption data from the external communication circuit 105a (Step S03).

The collector 150 outputs to the wide-area communication circuit 105c illustrated in FIG. 5, as the collected data, the situation data, operation state data, and power consumption data that are directed to the cloud server 200 (Step S04). The wide-area communication circuit 105c then transmits the collected data to the cloud server 200.

When the wide-area communication circuit 105c receives a control instruction determined based on the collected data from the cloud server 200, the facility controller 160 illustrated in FIG. 7 acquires the control instruction from the wide-area communication circuit 105c (Step S05).

The facility controller 160 then outputs to the air-conditioner communication circuit 105b the control instruction that is directed to the facility devices 21 to 23 (Step S06). The air-conditioner communication circuit 105b transmits the control instruction to the facility devices 21 to 23. The facility controller 160 then terminates the facility control process.

Figure 8:
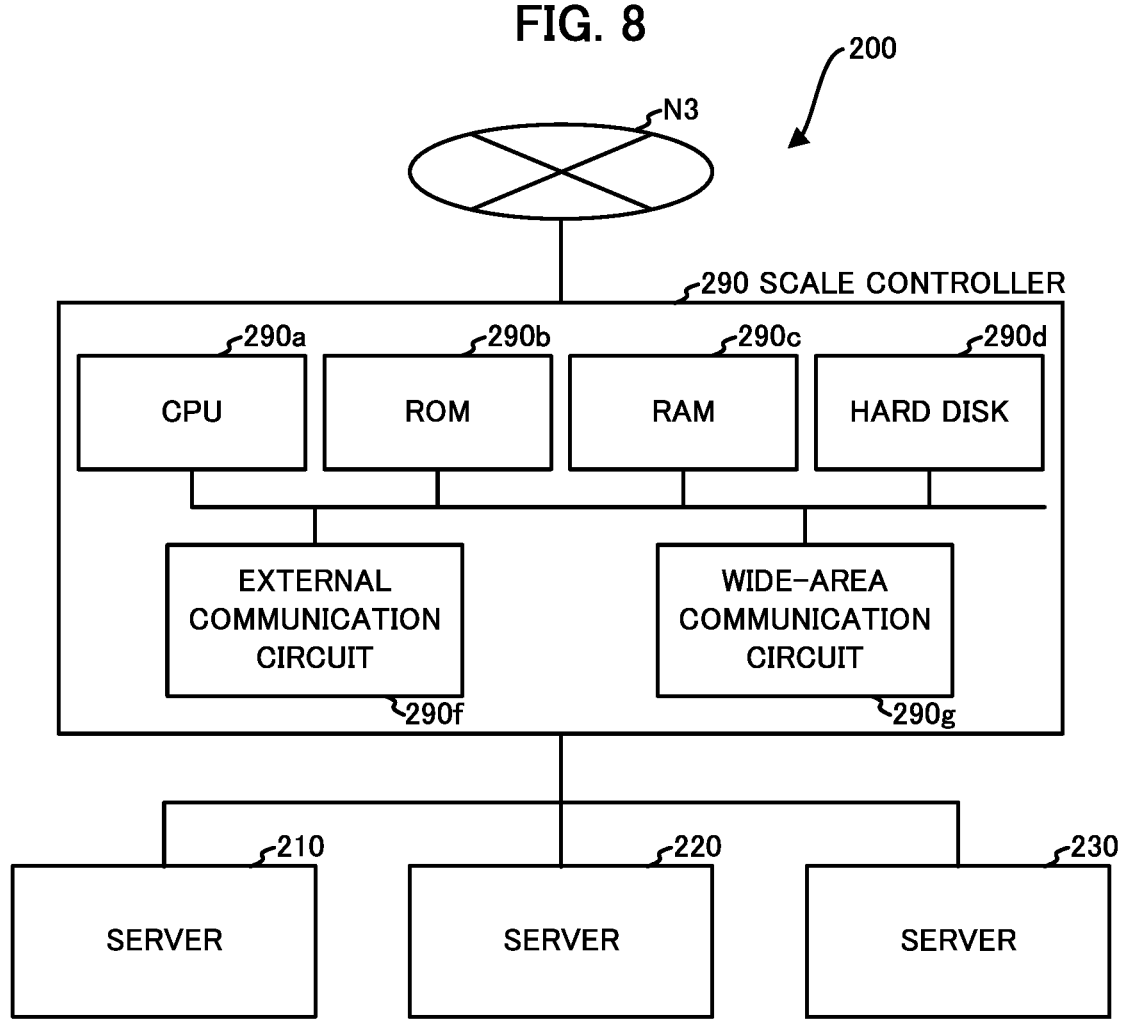
FIG. 8 is a drawing illustrating an exemplary configuration of a cloud server.

The cloud server 200 illustrated in FIG. 1 is achieved by physically multiple servers 210 to 230 as illustrated in FIG. 8, and a scale controller 290 for varying the number of servers that function as a virtually single cloud server 200 among the servers 210 to 230.

According to this embodiment, the business entity (hereinafter referred to as "cloud service provider") that owns the cloud server 200 and is responsible for maintenance and management of the cloud server 200 is, for example, an information technology (IT) company that provides cloud services to public. In contrast, the business entity (hereinafter referred to as "air-conditioning service provider") that owns the situation collecting system 11, the power consumption collecting system 12, the facility devices 21 to 23, the control device 100, and the terminal 900 illustrated in FIG. 1 and is responsible for maintenance and management of the these devices and systems is, for example, a manufacturer of the facility devices 21 to 23 or a maintenance management company.

The function of determining control instructions to the facility devices 21 to 23 is performed by the cloud server 200 managed by the cloud service provider, because the operation rate of the facility devices 21 to 23, which are air conditioners, significantly varies depending on the weather. In accordance with the variation in the operation rate of the facility devices 21 to 23 depending on the weather, the number of required servers that determine control instructions to the facility devices 21 to 23 also significantly varies depending on the weather. That is, the utilization of the cloud server 200 managed by the cloud service provider causes a lower usage cost than the own management of the fixed number of servers by the air-conditioning service provider in some cases, because the number of servers that function as a virtually single server can be varied depending on a variation in the operation rate.

Since the entity that manages the cloud server 200 differs from the entity that manages the facility devices 21 to 23 and the control device 100, the usage cost of the cloud server 200 is typically determined by a contract. According to this embodiment, the usage cost of the cloud server 200 is not fixed but determined based on the accumulated amount of system resources used by the servers 210 to 230 during a certain contract term, such as one month or one year.

Figure 9:
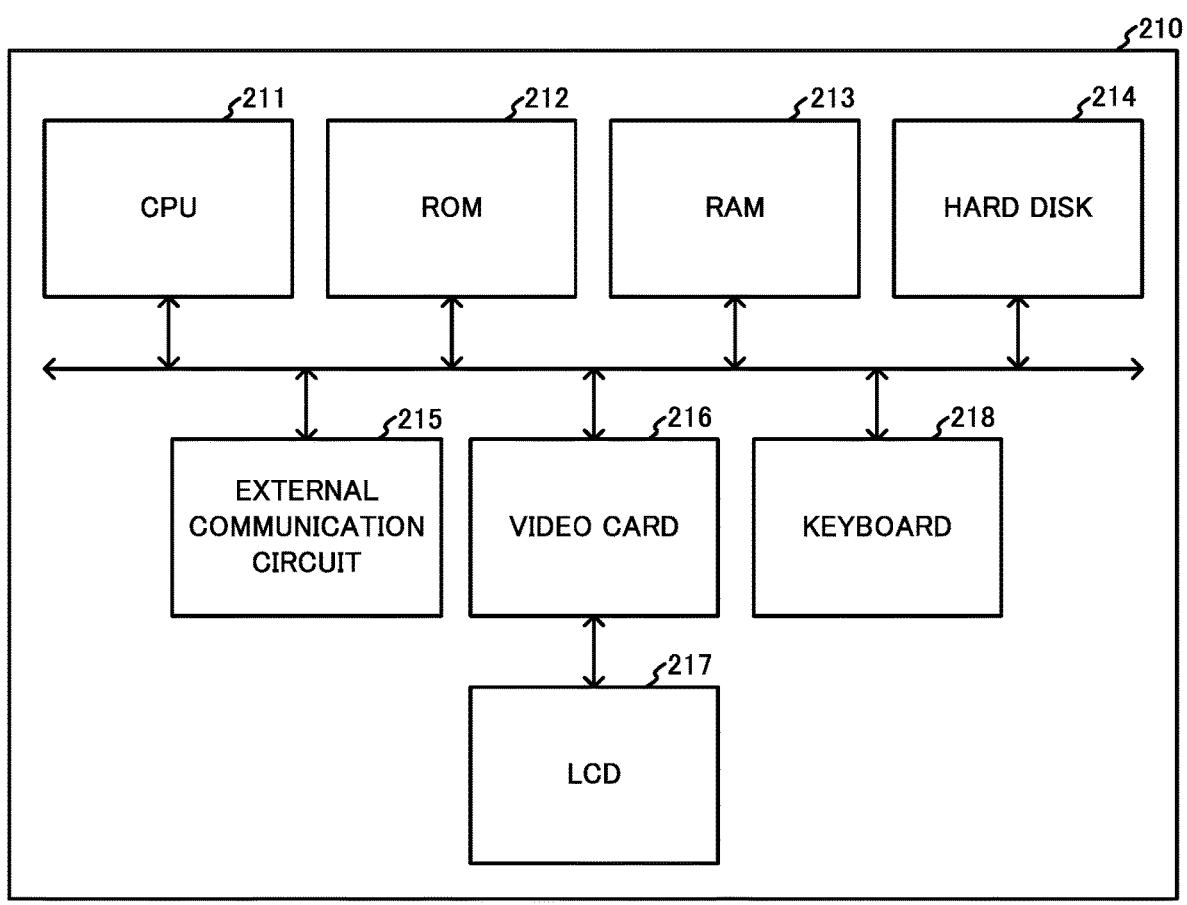
FIG. 9 is a drawing illustrating an exemplary hardware configuration of a server functioning as the cloud server.

The server 210, which functions as the cloud server 200, is equipped with a CPU 211, a ROM 212, a RAM 213, a hard disk 214, an external communication circuit 215, a video card 216, an LCD 217, and a keyboard 218, as illustrated in FIG. 9. These components have the configurations and functions identical to those of the CPU 101, the ROM 102, the RAM 103, the hard disk 104, the external communication circuit 105a, the video card 106, the LCD 107, and the keyboard 108 of the control device 100 illustrated in FIG. 5. The external communication circuit 215 is an example of communication means included in the cloud server according to the disclosure.

Figure 10:
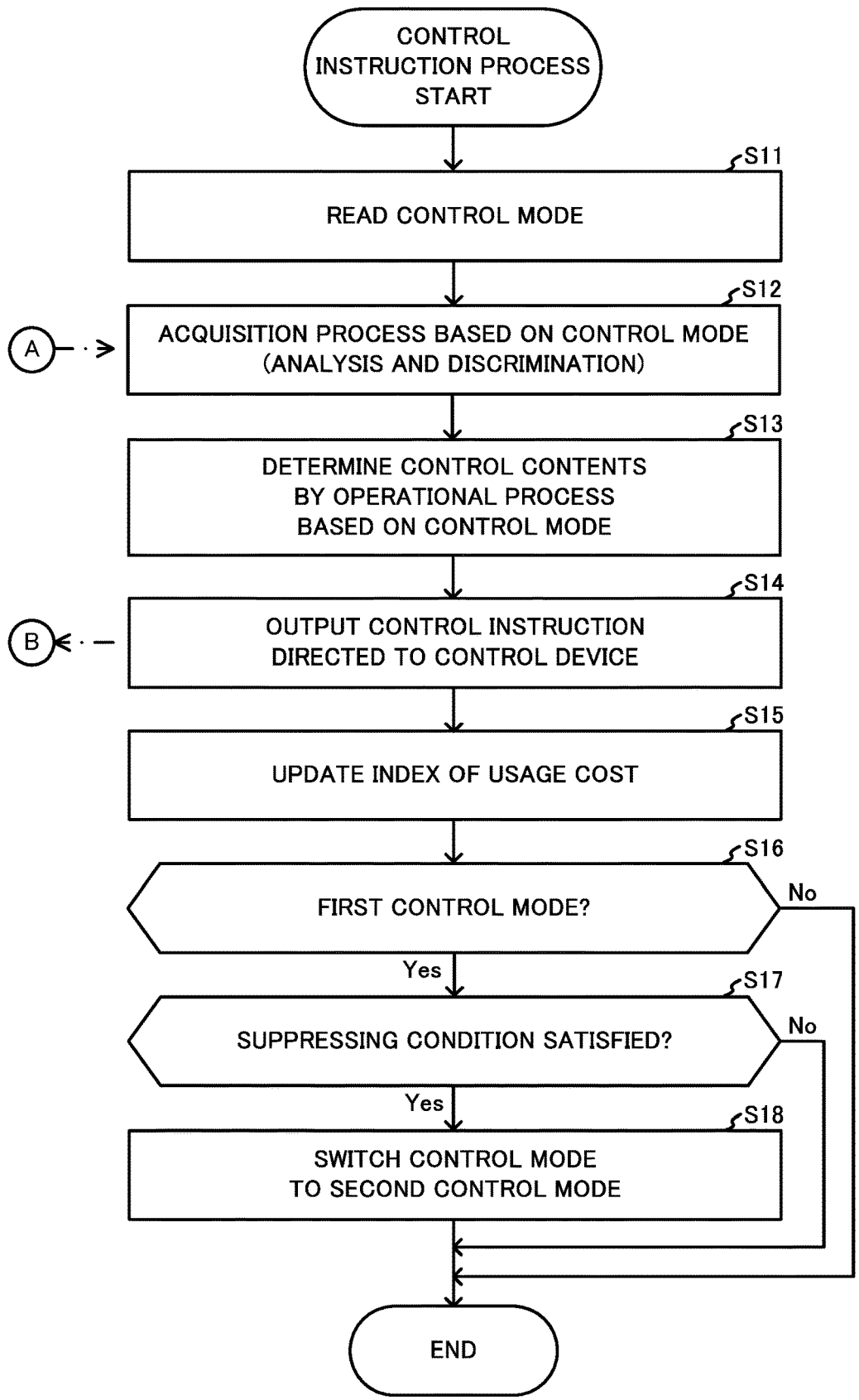
FIG. 10 is a flowchart illustrating an exemplary control instruction process executed by the server according to Embodiment 1.
Figure 11:
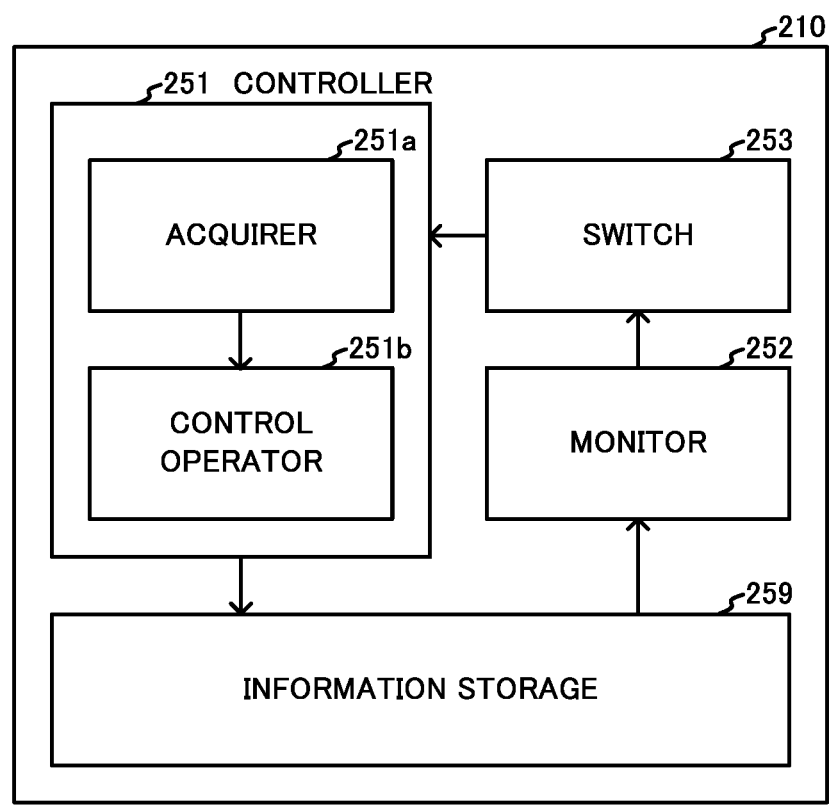
FIG. 11 is a functional block diagram illustrating exemplary functions of the server according to Embodiment 1.

When the external communication circuit 215 receives the collected data from the control device 100, the CPU 211 of the server 210 executes a control instruction process as illustrated in FIG. 10 for providing an instruction on control contents directed to the facility devices 21 to 23 based on the collected data. The CPU 211 of the server 210 thus functions as a controller 251 as illustrated in FIG. 11 for determining the control contents directed to the facility devices 21 to 23. The controller 251 is an example of control means according to the disclosure.

The CPU 211 of the server 210 also functions as a monitor 252 for monitoring the usage cost of the cloud server 200. The CPU 211 also functions as a switch 253. When a service charge, which is an index of the usage cost, exceeds the upper limit set by the user or maintenance manager, the switch 253 switches the process executed by the controller 251 to another process that requires a smaller amount of system resources. The switch 253 is an example of switching means included in the cloud server according to the disclosure.

The hard disk 214 illustrated in FIG. 9 functions as an information storage 259 for storing data indicating the service charge and the data indicating the upper limit of the service charge.

The controller 251 executes two types of control processes, that is, a first control process and a second control process as illustrated in FIG. 12. Each of the first control process and the second control process involves an acquisition process for acquiring the data received by the external communication circuit 215 illustrated in FIG. 9, and an operational process for performing an operation for control of the states of the facility devices 21 to 23 based on the data acquired in the acquisition process. The controller 251 thus includes an acquirer 251a for executing the acquisition process and a control operator 251b for executing the operational process, as illustrated in FIG. 11.

In the acquisition process (hereinafter referred to as "first acquisition process") of the first control process and the acquisition process (hereinafter referred to as "second acquisition process") of the second control process, data acquired from the operation state data include data indicating the inlet temperatures and the refrigerant pipe temperatures of the individual air conditioners and data indicating the target temperatures, as illustrated in FIG. 12, and the types of data acquired from the operation state data in the first acquisition process are identical to those in the second acquisition process. In the first acquisition process and the second acquisition process, data acquired from the power consumption data include data indicating the electric power consumptions of the individual air conditioners, and the types of data acquired from the power consumption data in the first acquisition process are identical to those in the second acquisition process.

Data acquired from the situation data in the first acquisition process include the user IDs in the individual air-conditioned spaces and the situation data on the users identified by the user IDs, and data acquired from the situation data in the second acquisition process include the total numbers of users at the individual floors. The type of data acquired from the situation data in the first acquisition process are different from those in the second acquisition process.

In the first acquisition process, acquired are the facility ID illustrated in FIG. 3, and the user IDs, location data, clothing data, and the requirement data on users staying in the space air-conditioned by the facility device identified by the facility ID. In contrast, in the second acquisition process, acquired are the floor ID illustrated in FIG. 3, and data indicating the total number of users staying at the floor identified by the floor ID. That is, fewer types and a smaller amount of data are acquired in the second acquisition process than those in the first acquisition process, and a shorter time and a smaller amount of processing are required for acquisition of data in the second acquisition process than those in the first acquisition process.

In the operational process (hereinafter referred to as "first operational process") of the first control process, a user-distribution reflected control operation is performed on the data acquired in the first acquisition process as an operation target. The user-distribution reflected control operation includes an operation, for each air-conditioned space, of estimating the amounts of heat released from the users staying in each air-conditioned space and from computers used by the users at the positions of the users, and then estimating the distribution of internal loads in the air-conditioned space based on the distribution of the estimated amounts of heat and the distribution of heat constantly generated or lost due to the environment of the air-conditioned space, such as windows and doors. The user-distribution reflected control operation further includes an operation of determining the outlet temperature and the volume of output airflow of the facility device that can achieve a reduction in the electric power consumption, based on the estimated distribution of internal loads, the difference between the inlet temperature and the target temperature of the facility device that air-conditions the space, and the refrigerant pipe temperature and the electric power consumption of the facility device.

In contrast, in the operational process (hereinafter referred to as "second operational process") of the second control process, an internal-load proportional control operation is performed on the data acquired in the second acquisition process as an operation target. The internal-load proportional control operation includes an operation of estimating the total amounts of heat released from the users staying at each floor and from computers based on the total number of users staying at the floor, and then estimating internal loads at the entire floor based on the estimated total amounts of heat and the total amount of heat constantly generated or lost at the floor. The internal-load proportional control operation further includes an operation of determining the outlet temperature and the volume of output airflow of the facility device that can achieve a reduction in the electric power consumption, based on the estimated internal loads, the difference between the inlet temperature and the target temperature of the facility device disposed at the floor, and the refrigerant pipe temperature and the electric power consumption of the facility device.

As described above, in the first operational process, a control operation is performed on the facility devices 21 to 23 in consideration of the distribution of users while in the second operational process, a control operation is performed in consideration of the total number of users. That is, fewer types and a smaller amount of data are used as an operation target in the second operational process than those in the first operational process, and a shorter time and a smaller amount of processing are required for operation of data in the second operational process than those in the first operational process. Accordingly, the second control process, which includes the second acquisition process and the second operational process, requires a shorter time and a smaller amount of processing than the first control process, which includes the first acquisition process and the first operational process.

The monitor 252 determines whether or not the service charge, which is an index of the usage cost of the cloud server 200, exceeds the upper limit, in order to monitor the operation cost of the control system 1. The operation cost of the control system 1 contains the usage cost of the cloud server 200 and an electric power cost necessary for running the facility devices 21 to 23. When determining that the service charge exceeds the upper limit, the monitor 252 outputs an alert reporting satisfaction of a condition (hereinafter referred to as "suppressing condition") for suppressing an increase in the operation cost.

When detecting the alert output from the monitor 252, the switch 253 performs a control to switch the process executed by the controller 251 from the first control process to the second control process, which requires a smaller amount of processing than the first control process. As the amount of processing executed by the controller 251 decreases, the amount of system resources used in the cloud server 200 also decreases. This configuration can suppress an increase in the usage cost of the cloud server 200, which is determined based on the accumulated amount of processing executed by the controller 251.

The information storage 259 stores a group of applications including a first application involving the first control process and a second application involving the second control process. The information storage 259 also stores a flag representing whether the control mode of the controller 251 is a first control mode for executing the first application or a second control mode for executing the second application. This flag represents the first control mode in the initial state, which is the state at the start of a contract term.

The information storage 259 serves as a shared memory shared by the servers 210 to 230, and stores data indicating the service charge for use of the cloud server 200. The service charge for use of the cloud server 200 is determined based on the accumulated amounts of processing executed by the servers 210 to 230, which function as the cloud server 200.

The information storage 259 further stores data necessary for the control operation. Examples of the data include data indicating an averaged amount of heat released from a user and a computer used by the user, data indicating environmental elements, such as the positions of windows and doors disposed in each air-conditioned space, and data indicating an amount of heat constantly generated or lost due to the environmental elements.

At the start of the control instruction process illustrated in FIG. 10, the controller 251 reads a flag representing the control mode from the information storage 259 (Step S11). Since the control mode is set to the first control mode in the initial state, the flowing explanation is directed to the case of the first control mode.

The acquirer 251a then executes the first acquisition process, as the acquisition process based on the control mode. The acquirer 251a thus analyzes the collected data received by the external communication circuit 215 illustrated in FIG. 9, pursuant to the data format illustrated in FIG. 3, and thereby determining the position where the data to be acquired in the first acquisition process is located in the collected data. The acquirer 251a skips the collected data to the determined position and selects the portion of the collected data ranging from the determined position and having the length corresponding to the data to be acquired, and thereby discriminating the data to be acquired. The acquirer 251a then acquires the discriminated data from the collected data (Step S12).

The control operator 251b then executes the first operational process, as the operational process based on the control mode, and thus achieves the user-distribution reflected control operation. The control operator 251b thus determines control contents directed to the facility devices 21 to 23 and generates a control instruction that designates the control contents (Step S13).

The control operator 251b then outputs to the external communication circuit 215 illustrated in FIG. 9 the control instruction that is directed to the control device 100 (Step S14). The external communication circuit 215 transmits the control instruction to the control device 100.

The controller 251 then multiplies the amount of data acquired in Step S12 and the time and the amount of processing required for the acquisition process by the charge per unit amount of data, the charge per unit time, and the charge per unit amount of processing, respectively, and thereby calculating an increase in the service charge for use of the cloud server 200. Similarly, the controller 251 calculates an increase in the service charge, based on the time and the amount of processing required for the operational process in Step S13. The controller 251 then adds the increases in the service charge occurred in Steps S12 and S13 to the service charge indicated by the data stored in the shared memory of the information storage 259. The controller 251 then determines the service charge after addition of the increases to be the index of the usage cost of the cloud server 200, and updates the data stored in the shared memory of the information storage 259 to data indicating the service charge after addition of the increases (Step S15).

The monitor 252 then determines that the control mode is the first control mode (Step S16; Yes). This determination is performed because the steps explained below are not required to be executed when the control mode is the second control mode.

The monitor 252 then reads the data indicating the service charge and the data indicating the upper limit of the service charge stored in the information storage 259. The monitor 252 then determines whether or not the service charge for use of the cloud server 200 exceeds the upper limit and thus determines whether or not the service charge satisfies the suppressing condition for suppressing an increase in the operation cost of the control system 1 (Step S17). When determining that the service charge does not exceed the upper limit and thus does not satisfy the suppressing condition (Step S17; No), the monitor 252 terminates the control instruction process.

In contrast, when determining that the service charge exceeds the upper limit and thus satisfies the suppressing condition (Step S17; Yes), the monitor 252 outputs an alert. The switch 253 detects the alert, and then updates the flag stored in the information storage 259 to the flag representing the second control mode and terminates the control instruction process so as to perform a control to switch the control mode to the second control mode, the control being directed to the controller 251 (Step S18).

At the start of the subsequent control instruction process, the controller 251 reads the flag representing the second control mode from the information storage 259 again (Step S11).

The acquirer 251a then executes the second acquisition process, in which fewer types and a smaller amount of data are discriminated and acquired than those in the first acquisition process (Step S12). The control operator 251b then executes the second operational process, in which fewer types and a smaller amount of data are used as an operation target and a smaller amount of processing is required than that in the first operational process, and thus achieves the internal-load proportional control operation and generates a control instruction (Step S13).

As explained above, when the suppressing condition is satisfied, the switch 253 performs, by switching the control mode, a control to maintain the stop state of the first control process and switch the state of the second control process to the execution state, the control being directed to the controller 251.

After the processes in Steps S14 and S15 are executed, the monitor 252 determines that the control mode is the second control mode after switching (Step S16; No), and terminates the control instruction process.

The scale controller 290 illustrated in FIG. 8 is equipped with a CPU 290a, a ROM 290b, a RAM 290c, a hard disk 290d, an external communication circuit 290f, and a wide-area communication circuit 290g. These components have the configurations and functions identical to those of the CPU 101, the ROM 102, the RAM 103, the hard disk 104, the external communication circuit 105a, and the wide-area communication circuit 105c illustrated in FIG. 5.

The CPU 290a of the scale controller 290 increases or decreases the number of servers to which the data received by the wide-area communication circuit 290g is transferred among the servers 210 to 230, in response to an increase or decrease in the amount of data received per unit time by the wide-area communication circuit 290g via the public network N3. The scale controller 290 thus increases or decreases the number of servers that function as a virtually single cloud server 200 among the servers 210 to 230.

Figure 13:
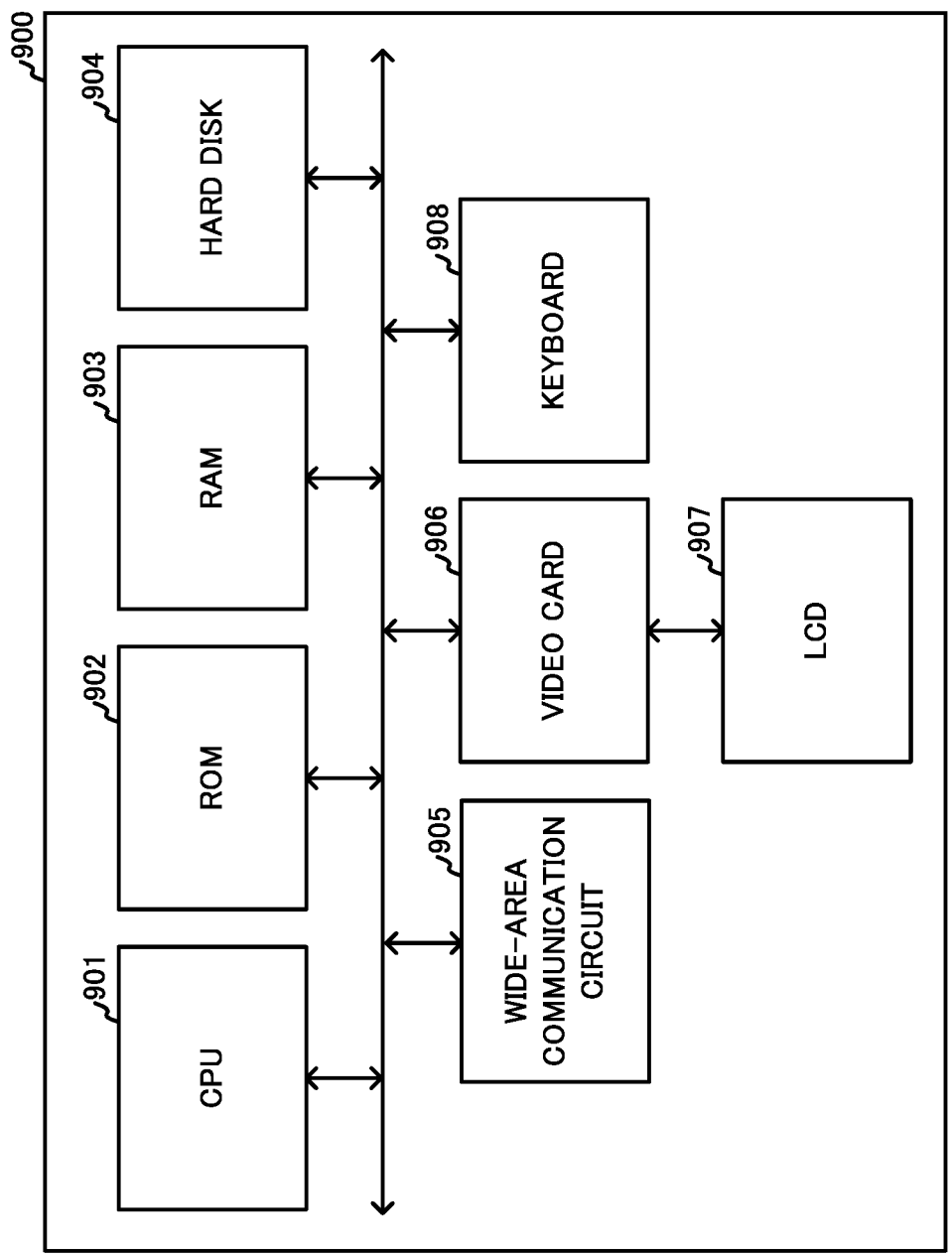
FIG. 13 is a drawing illustrating an exemplary hardware configuration of a terminal.

The terminal 900 illustrated in FIG. 1 is equipped with a CPU 901, a ROM 902, a RAM 903, a hard disk 904, a wide-area communication circuit 905, a video card 906, an LCD 907, and a keyboard 908, as illustrated in FIG. 13. These components have the configurations and functions identical to those of the CPU 101, the ROM 102, the RAM 103, the hard disk 104, the wide-area communication circuit 105c, the video card 106, the LCD 107, and the keyboard 108 illustrated in FIG. 5. The LCD 907 is an example of display means according to the disclosure.

The keyboard 908 of the terminal 900 inputs the upper limit of the service charge of the cloud server 200 in accordance with, for example, an operation of the user or maintenance manager. The CPU 901 of the terminal 900 then outputs to the wide-area communication circuit 905 a request directed to the cloud server 200. The request contains data indicating the input upper limit and requires updating of the data indicating the upper limit stored in the cloud server 200 to the data contained in the request. When the server 210, which functions as the cloud server 200, receives the request, then the server 210 updates the data indicating the upper limit stored in the information storage 259 to the data indicating the upper limit contained in the request. The servers 220 and 230 execute the identical updating operations. The upper limit is thus set by the user or maintenance manager.

Figure 14:
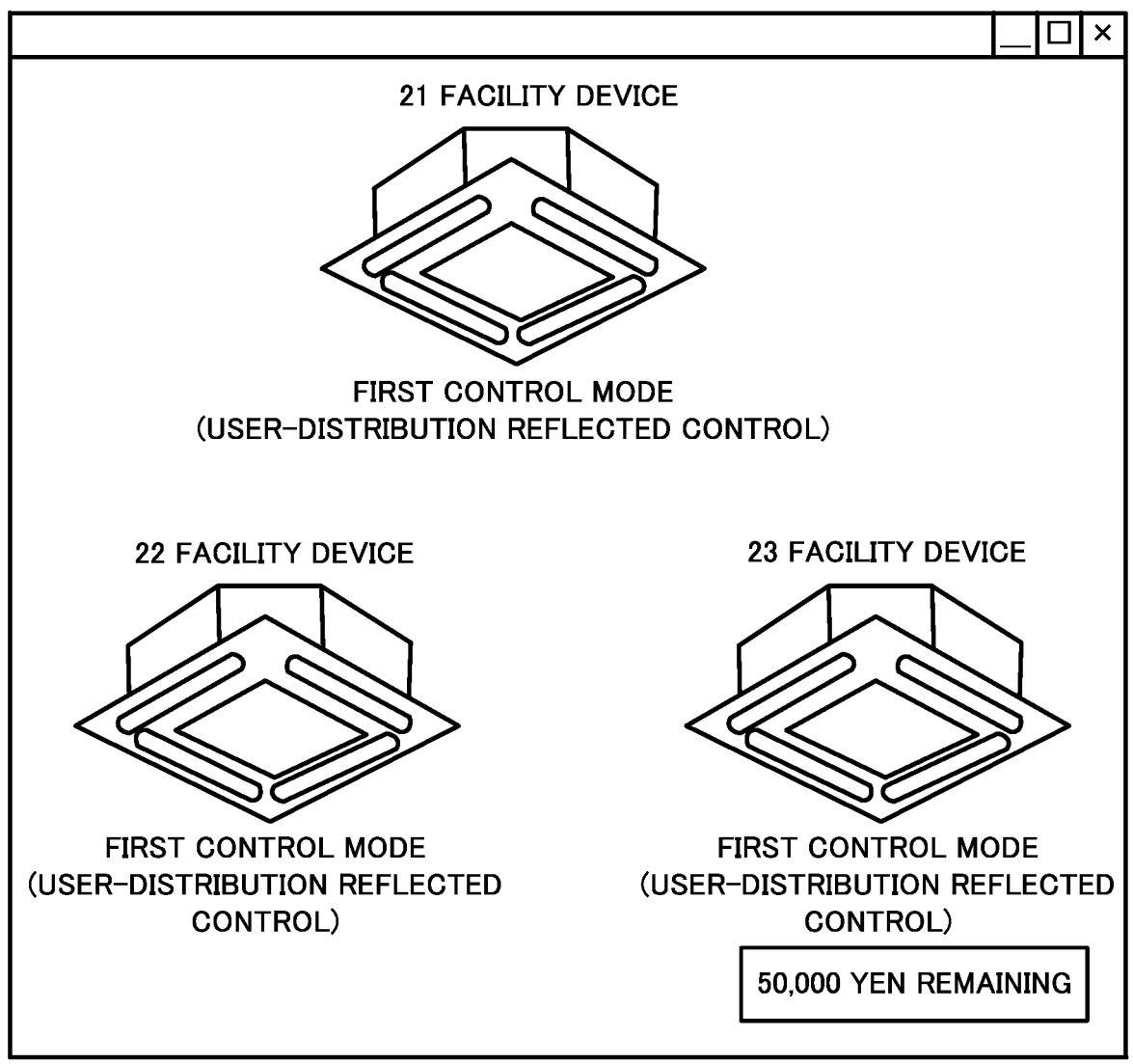
FIG. 14 is a drawing illustrating an exemplary screen displayed by the terminal according to Embodiment 1.

The CPU 901 of the terminal 900 also outputs to the wide-area communication circuit 905 requests directed to the cloud server 200, for example, at certain intervals. The requests require a reply containing the index of the usage cost of the cloud server 200, the upper limit of the index, and the control processes or control modes that are being executed in the respective facility devices 21 to 23. When the wide-area communication circuit 905 receives the reply from the cloud server 200, the CPU 901 of the terminal 900 controls the LCD 907 to display a screen illustrated in FIG. 14 based on the reply. The screen displayed on the LCD 907 contains a character string representing the difference between the index and the upper limit, icons representing the respective facility devices 21 to 23, and character strings representing the control processes or control modes that are being executed in the respective facility devices 21 to 23. In an exemplary case where the service charge for use of the cloud server 200, which is the index, is smaller than the upper limit by 50,000 yen, the LCD 907 displays the character string of "50,000 yen remaining". In contrast, in another exemplary case where the service charge is larger than the upper limit by 50,000 yen, the LCD 907 displays the character string of "Excess of 50,000 yen" or simply displays the character string of "0 yen remaining".

In this configuration, when the suppressing condition for suppressing an increase in the operation cost is satisfied, the switch 253 of the server 210, which functions as the cloud server 200, performs a control to maintain the stop state of the first control process and switch the state of the second control process, which requires a smaller amount of processing than the first control process, to the execution state. This configuration can suppress an increase in the operation cost determined depending on the amount of executed processing and the cloud server 200 continues to control the facility devices 21 to 23 through the second control process.

This configuration can suppress an increase in the operation cost and the cloud server 200 continues to control the facility devices 21 to 23, also in the case where the cloud server 200 receives a large amount of data from a malicious third party. The cloud server 200 makes the manipulation of the operation cost by a third party more difficult and can therefore achieve a less vulnerable system than conventional systems.

In this configuration, when the service charge for use of the cloud server 200 exceeds the upper limit, the switch 253 of the cloud server 200 determines satisfaction of the suppressing condition and switches the control process executed by the controller 251 from the first control process to the second control process. This configuration can prevent the service charge for use of the cloud server 200 from exceeding a value expected by the air-conditioning service provider.

In this configuration, when the cloud server 200 receives the collected data from the control device 100, the cloud server 200 starts the control instruction operation illustrated in FIG. 10. The cloud server 200 determines and outputs the control instruction in Steps S13 and S14 and then switches the control mode in Step S18. This configuration requires a shorter time from reception of the collected data until transmission of the control instruction, thereby providing a higher responsivity, in comparison to a configuration in which the switching of the control mode precedes the determination and output of the control instruction.

Modification 1 of Embodiment 1

According to Embodiment 1, the monitor 252 illustrated in FIG. 11 outputs an alert when the service charge for use of the cloud server 200 exceeds the upper limit, and the switch 253 switches the control mode when detecting the alert. This configuration, however, should not be construed as limiting the disclosure. The monitor 252 may predict a service charge on the future date and time a certain period after the system date and time, based on an increase in the service charge during the certain period from the past date and time to the system date and time. The monitor 252 may then output an alert when the predicted service charge exceeds the upper limit. In an exemplary case of the contract term of one month, on the date 15 days after the first date of the contract term, the monitor 252 may predict a service charge that will be reached on the last date of the contract term by doubling the service charge reached on the date 15 days after the first date. The monitor 252 may then output an alert when the predicted service charge on the last date exceeds the upper limit.

This configuration can more certainly suppress the service charge from exceeding the upper limit, in comparison to the configuration where an alert is output when the service charge for use of the cloud server 200 exceeds the upper limit.

Modification 2 of Embodiment 1

Although the service charge for use of the cloud server 200 is used as the index of the usage cost of the cloud server 200 according to Embodiment 1, this configuration should not be construed as limiting the disclosure. The index of the usage cost of the cloud server 200 may also be any of the accumulated amount of processing executed in the cloud server 200, the accumulated processing period, the accumulated amount of used memory of the cloud server 200, and the accumulated amount of data acquired in the acquisition process.

Modification 3 of Embodiment 1

According to Embodiment 1, when the suppressing condition is satisfied, the control process executed in the cloud server 200 is switched from the first control process that involves the user-distribution reflected control to the second control process that involves the internal-load proportional control and requires a smaller amount of processing than the first control process. The first control process executed in the cloud server 200, however, should not be limited to the process that involves the user-distribution reflected control, and the second control process should not be limited to the process that involves the internal-load proportional control. The first control process executed in the cloud server 200 may be any process aimed at control of the facility devices 21 to 23, and the second control process may be any process aimed at control of the facility devices 21 to 23 that requires a smaller amount of processing than the first control process. For example, the first control process may be a process of controlling the temperature and volume of air output from each of the facility devices 21 to 23 to users, based on requirements or comfortability evaluations from the users. The second control process may be a process of making the average temperature of the spaces air-conditioned by the facility devices 21 to 23 closer to a target temperature.

Modification 4 of Embodiment 1

Although the facility devices 21 to 23 are air conditioners according to Embodiment 1, this configuration should not be construed as limiting the disclosure. The facility devices 21 to 23 may also be home appliances, such as lighting devices, televisions, or radios. The first control process may be a process that involves a control reflecting a user distribution, for example, a process of turning off the lighting devices or turning off the home appliances disposed in a space including no user. The second control process may be a process of decreasing the light intensities of all the lighting devices and lowering the volumes of sound output from the home appliances regardless of the existence of users.

Modification 5 of Embodiment 1

According to Embodiment 1, the cloud server 200 switches the control process from the first control process to the second control process when the suppressing condition for suppressing an increase in the operation cost is satisfied. This configuration, however, should not be construed as limiting the disclosure. In response to satisfaction of the suppressing condition, the cloud server 200 may execute the first control process at longer intervals than those before satisfaction of the suppressing condition, so as to suppress an increase in the operation cost.

Modification 6 of Embodiment 1

In the second acquisition process included in the second control process, a smaller amount of data is acquired than that in the first acquisition process included in the first control process, according to Embodiment 1. The cloud server 200 thus switches the control process from the first control process to the second control process in response to satisfaction of the suppressing condition, thereby suppressing an increase in the operation cost, according to Embodiment 1. This configuration, however, should not be construed as limiting the disclosure. The first control process may include a first transmission process for transmitting data to the control device 100, while the second control process may include a second transmission process in which a smaller amount of data is transmitted to the control device 100 than that in the first transmission process. The cloud server 200 may switch the control process from the first control process to the second control process in response to satisfaction of the suppressing condition, and thus reduce the amount of transmitted data, thereby suppressing an increase in the operation cost.

Modification 7 of Embodiment 1

According to Embodiment 1, the server 210, which functions as the cloud server 200, completes the first control process based on the first control mode in Steps S12 and S13 illustrated in FIG. 10, switches the control mode to the second control mode in Step S18, and then terminates the control instruction process. In the sequent control instruction process, the server 210 maintains the stop state of the first control process based on the second control mode in Steps S12 and S13, and then switches the state of the second control process to the execution state, according to Embodiment 1. The timing of switching the control mode should not be limited to after termination of execution of the first control process, but may be during execution of the first control process. In this case, the server 210 switches the control mode during execution of the first control process, that is, the server 210 switches the state of the first control process from the execution state to the stop state and switches the state of the second control process to the execution state.

In this configuration, the control mode can be switched even during execution of the first control process, resulting in a shorter period from satisfaction of the suppressing condition to switching of the control mode. The configuration can therefore start suppressing an increase in the operation cost more shortly than the configuration according to Embodiment 1.

Embodiment 2

Although the index of the usage cost of the cloud server 200 is the service charge for use of the cloud server 200 according to Embodiment 1, this configuration should not be construed as limiting the disclosure. According to this embodiment, the index of the usage cost of the cloud server 200 is the accumulated total number of users staying in the spaces air-conditioned by the facility devices 21 to 23. Since the first control process involves the user-distribution reflected control operation, the amount of processing required for the first control process is determined depending on the numbers of users staying in the air-conditioned spaces where the facility devices 21 to 23 are installed. The following description is mainly focused on the differences of this embodiment from Embodiment 1.

The accumulated total number of users staying in the spaces air-conditioned by the facility devices 21 to 23 is represented by the products of the numbers of users staying in the air-conditioned spaces and the respective staying times. In an exemplary case where two users stay in the space air-conditioned by the facility device 21 for one hour, a user stays in the space air-conditioned by the facility device 22 for one hour, and no user stays in the space air-conditioned by the facility device 23, the accumulated total number of users is found to be the value "3" through calculation using the expression (1) below:

$$\text{Accumulated total number of users} = 2 \text{ (persons)} \times 1 \text{ (hour)} + 1 \text{ (person)} \times 1 \text{ (hour)} + 0 \text{ (person)} \times 0 \text{ (hour)} = 3 \text{ (person-hours)} \quad (1)$$

Figure 15:
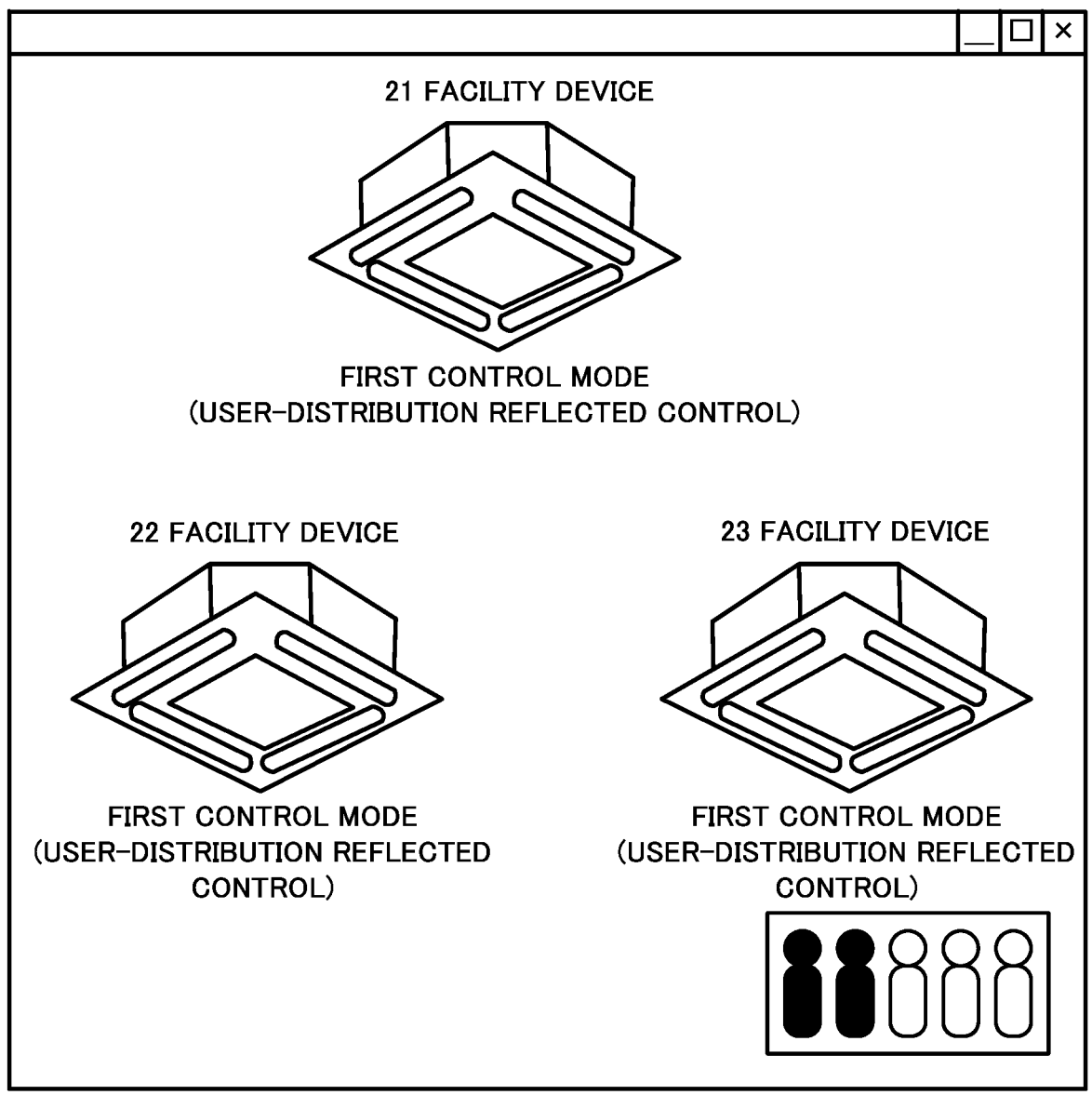
FIG. 15 is a drawing illustrating an exemplary screen displayed by a terminal according to Embodiment 2.

The CPU 901 of the terminal 900 controls the LCD 907 to display a screen as illustrated in FIG. 15 and containing white human-like icons representing the difference between the accumulated total number of users and the upper limit of the accumulated number. In an exemplary case of the accumulated total number equal to 40% of the upper limit, the LCD 907 displays two black human-like icons and three white human-like icons, which mean that the accumulated number is equal to 40% of the upper limit and the difference between the accumulated number and the upper limit is equal to 60% of the upper limit. In another exemplary case of the accumulated number increasing to 50% of the upper limit, the LCD 907 displays two human-like icons having black upper and lower bodies, one human-like icon having the black lower body and the white upper body, and two human-like icons having white upper and lower bodies, which mean that the accumulated number is equal to 50% of the upper limit and the difference between the accumulated number and the upper limit is equal to 50% of the upper limit. In another exemplary case of the accumulated number increasing to the upper limit or exceeding the upper limit, the LCD 907 displays five black human-like icons having white upper and lower bodies.

In this configuration, as the total number of users staying in the spaces air-conditioned by the facility devices 21 to 23 increases, the amount of system resources of the cloud server 200 required in the first control process also increases, and the terminal 900 displays white human-like icons representing the difference between the accumulated total number of users and the upper limit of the accumulated number. This configuration allows a user to readily understand how much amount of system resources is used to switch the process of determining the control contents directed to the facility devices 21 to 23 from the first control process to the second control process. The configuration also allows the user to readily notice that the control contents directed to the facility devices 21 to 23 are changed in accordance with the switching of the control process and readily understand the reason for the change.

Embodiment 3

According to Embodiment 1, the cloud server 200 executes the first control process that involves the user-distribution reflected control and the second control process that involves the internal-load proportional control to the facility devices 21 to 23, as illustrated in FIG. 12. This configuration, however, should not be construed as limiting the disclosure. According to this embodiment, the cloud server 200 executes a first control process that involves a selective demand control and a second control process that involves a uniform demand control to the facility devices 21 to 23, as illustrated in FIG. 16. The following description is mainly focused on the differences of this embodiment from Embodiment 1.

The selective demand control is executed in the cloud server 200, for example, when the cloud server 200 receives a request for a reduction in the electric power consumption via the control device 100 illustrated in FIG. 1, which is transmitted from a non-illustrated server of a power company that supplies electric power to the facility devices 21 to 23. The request for a reduction in the electric power consumption is transmitted to multiple electric power destinations from the power company in order to continue stable power supply, when the predicted total amount of electric power consumptions in the electric power destinations exceeds the upper limit, for example, due to a temperature rise.

The selective demand control involves selecting a space subject to an increase or decrease in the target temperature by a certain value among the spaces air-conditioned by the facility devices 21 to 23, based on the total number of users staying in the spaces air-conditioned by the facility devices 21 to 23. The selective demand control also involves determining the control contents directed to the facility device that air-conditions the selected space, based on the difference between the inlet temperature of this facility device and the latest target temperature after the increase or decrease by the certain value and based on the refrigerant pipe temperature and the electric power consumption of this facility device. For example, when a space where no user stays is selected, the increase or decrease in the target temperature in the space can achieve a reduction in the electric power consumption without affecting the air-conditioning performances.

The uniform demand control differs from the selective demand control in that the control contents directed to the facility devices 21 to 23 are determined based on the latest target temperatures of the facility devices 21 to 23 after a uniform increase or decrease by a certain value.

For the selective demand control, the data indicating the target temperatures, the inlet temperatures, and the refrigerant pipe temperatures of the facility devices 21 to 23 are acquired from the operation state data, and the data indicating the electric power consumptions of the facility devices 21 to 23 are also acquired, in the first acquisition process of the first control process. For the uniform demand control, the data indicating the target temperatures, the inlet temperatures, the refrigerant pipe temperatures, and the electric power consumptions of the facility devices 21 to 23 are acquired in the second acquisition process of the second control process.

In the first acquisition process, the facility IDs illustrated in FIG. 3 and the data indicating the total number of users staying in the spaces air-conditioned by the facility devices 21 to 23 identified by the facility IDs are acquired from the situation data. In contrast, in the second acquisition process, no data is acquired from the situation data in the second acquisition process, because of the uniform demand control for uniformly varying the target temperatures regardless of the existence of users in the air-conditioned spaces. That is, fewer types and a smaller amount of data are acquired in the second acquisition process than those in the first acquisition process, and a shorter time and a smaller amount of processing are required for acquisition of data in the second acquisition process than those in the first acquisition process.

In the first operational process included in the first control process, the data acquired in the first acquisition process is used as an operation target, an air-conditioned space subject to increase or decrease in the target temperature is selected, and then an operation to increase or decrease the target temperature of the selected air-conditioned space is performed. In contrast, in the second operational process of the second control process, the data acquired in the second acquisition process is used as an operation target, an operation to uniformly increase or decrease the target temperatures of the air-conditioned spaces is performed. That is, fewer types and a smaller amount of data are used as an operation target in the second operational process than those in the first operational process, and a shorter time and a smaller amount of processing are required for operation of data in the second operational process than those in the first operational process.

Accordingly, the second control process that includes the second acquisition process and the second operational process requires a shorter time and a smaller amount of processing than the first control process that includes the first acquisition process and the first operational process.

When the external communication circuit 215 illustrated in FIG. 9 receives a request for a reduction in the electric power consumption, the CPU 211 of the server 210, which functions as the cloud server 200, executes the control instruction process illustrated in FIG. 10 for outputting a control instruction for a reduction in the electric power consumption through the selective demand control or the uniform demand control, for example, at certain intervals until the sunset time. After the sunset time, a temperature drop decreases the necessity to reduce the electric power consumption.

At the start of the control instruction process, the process in Step S11 is performed to read a flag representing the control mode. Then, either one of the first control process that involves the selective demand control and the second control process that involves the uniform demand control is executed in accordance with the control mode in Steps S12 to S14. The control instruction for a reduction in the electric power consumption is output and then is directed to the facility devices 21 to 23.

The controller 251 then reads the data stored in the information storage 259 and acquires the index of the usage cost of the cloud server 200. According to this embodiment, the index is the accumulated number of days of execution of the first control process for reducing the electric power consumption, for example, in response to a request transmitted on a day at a high temperature. The increase in the days of execution of the first control process also increases the amount of system resources of the cloud server 200 required for the first control process, thereby increasing the usage cost.

In Step S15, the controller 251 acquires a time stamp of the data indicating the index stored in the information storage 259 and determines whether the date of the time stamp differs from the system date. The purpose of this step is to update the index representing the accumulated number of days of execution of the first control process only once each day of execution of the first control process. When determining that the date of the time stamp differs from the system date, the controller 251 updates the data stored in the information storage 259 to the data indicating the value calculated by incrementing the accumulated number of days of execution of the first control process by the value "1".

When the accumulated number of days of execution of the first control process exceeds the upper limit, the process for reducing the electric power consumption is switched from the first control process to the second control process upon execution of the processes in Steps S16 to S18, followed by termination of the control instruction process.

Figure 17:
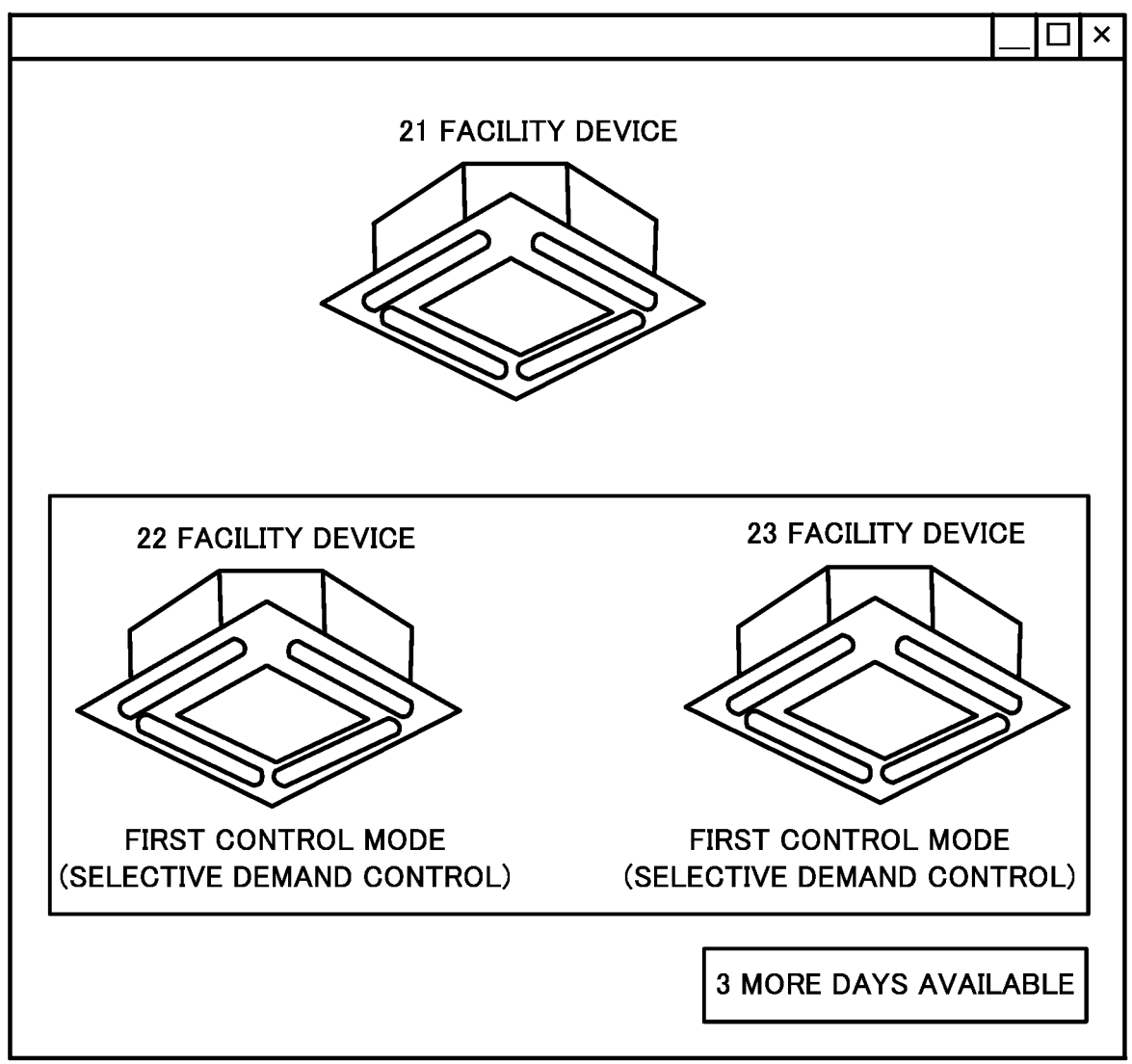
FIG. 17 is a drawing illustrating an exemplary screen displayed by a terminal according to Embodiment 3.
Figure 19:
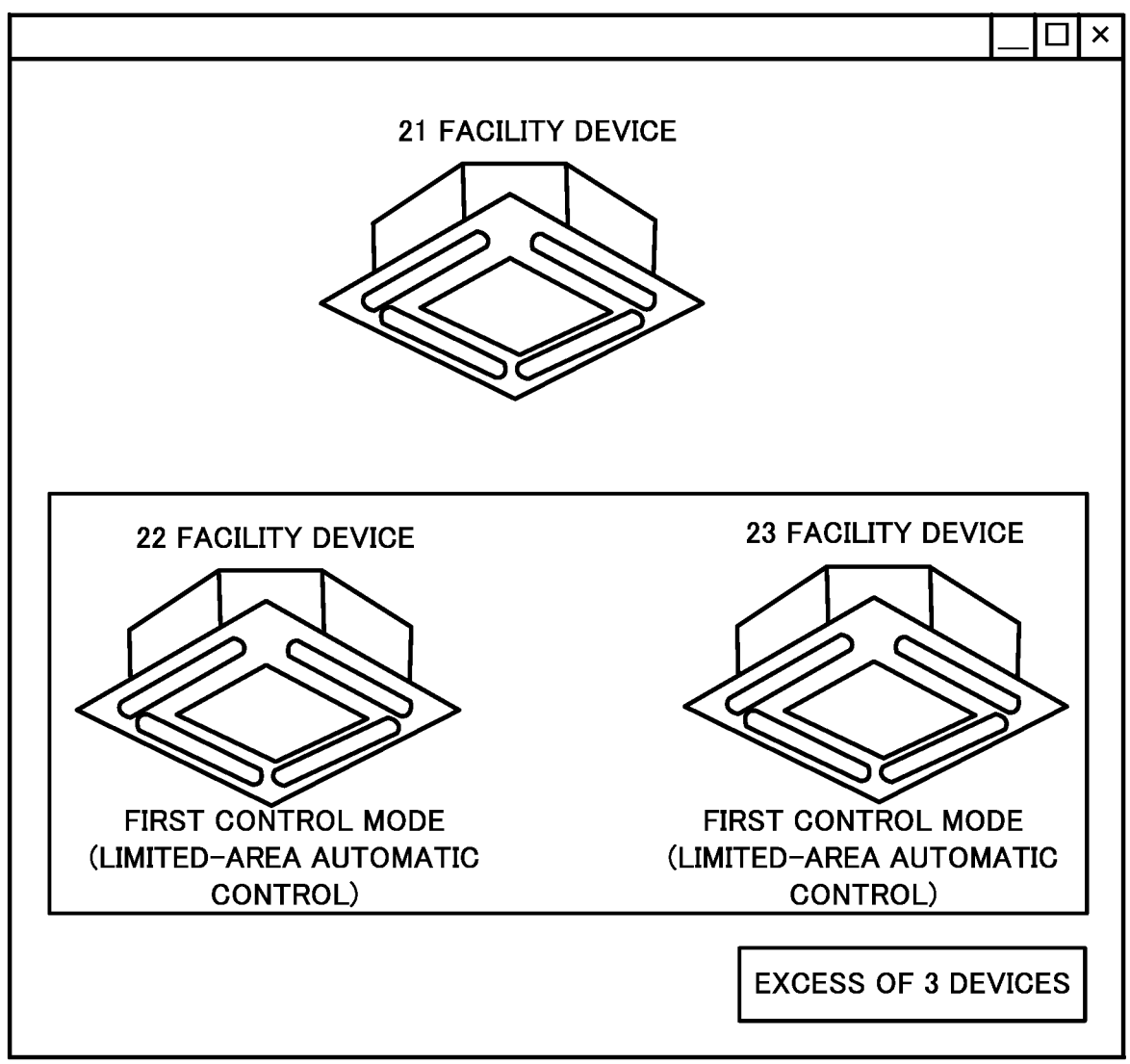
FIG. 19 is a drawing illustrating an exemplary screen displayed by a terminal according to Embodiment 4.

The CPU 901 of the terminal 900 illustrated in FIG. 13 causes the LCD 907 to display a screen illustrated in FIG. 17, which contains a character string representing the difference between the index, which is the accumulated number of days of execution of the first control process, and the upper limit of the index. During execution of the first control process that involves the selective demand control, the screen displayed by the terminal 900 further contains a frame surrounding the facility devices 22 and 23 that are selected among the facility devices 21 to 23 and subject to variations in the target temperatures, and elements representing that the selective demand control is being performed to the selected facility devices 22 and 23. In an exemplary case of the accumulated number of days three days smaller than the upper limit, the LCD 907 displays the character string of "3 more days available". In contrast, in another exemplary case of the accumulated number three days larger than the upper limit, the LCD 907 displays the character string of "Excess of 3 days" or simply displays the character string of "0 more days available".

In this configuration, the terminal 900 displays the character string representing the difference between the accumulated number of days of execution of the first control process and the upper limit of the accumulated number. This configuration allows a user to readily understand how much amount of system resources is used to switch the process for reducing the electric power consumption from the first control process that involves the selective demand control to the second control process that involves the uniform demand control. Furthermore, the terminal 900 displays the frame surrounding the facility devices 22 and 23 of which the target temperatures are varied through the selective demand control, among the facility devices 21 to 23. This configuration also allows the user to readily find the facility devices for which the control contents are changed due to variations in the target temperatures and readily understand the reason for the change.

Embodiment 4

According to Embodiment 1, the cloud server 200 executes the first control process that involves the user-distribution reflected control and the second control process that involves the internal-load proportional control to the facility devices 21 to 23, as illustrated in FIG. 12. This configuration, however, should not be construed as limiting the disclosure. According to this embodiment, the cloud server 200 executes the first control process that involves a whole-area automatic control and the second control process that involves a limited-area automatic control to the facility devices 21 to 23, as illustrated in FIG. 18. The following description is mainly focused on the differences of this embodiment from Embodiment 1.

The whole-area automatic control is a user-distribution reflected control over all the spaces air-conditioned by the facility devices 21 to 23. In contrast, the limited-area automatic control is a user-distribution reflected control over only a space designated by a user or maintenance manager, such as a reception or conference room, among the spaces air-conditioned by the facility devices 21 to 23. Data indicating the space designated by the user or maintenance manager is stored in the information storage 259 of the server 210, which functions as the cloud server 200.

In the first acquisition process of the first control process that involves the whole-area automatic control, the user IDs, the location data, the clothing data, and the requirement data on users staying in the spaces air-conditioned by the facility devices identified by all the facility IDs contained in the situation data are acquired from the situation data. In addition, in the first acquisition process, the data indicating the target temperatures, the inlet temperatures, and the refrigerant pipe temperatures of all the facility devices 21 to 23 are acquired from the operation state data, and the power consumption data on the facility devices 21 to 23 is also acquired.

In contrast, in the second acquisition process of the second control process that involves the limited-area automatic control, acquired are the facility ID of the facility device that air-conditions the space designated by the user or maintenance manager among the facility IDs contained in the situation data, and the user IDs, the location data, the clothing data, and the requirement data on the users staying in the air-conditioned space. In addition, in the second acquisition process, the data indicating the target temperature, the inlet temperature, and the refrigerant pipe temperature of the facility device that air-conditions the space designated by the user or maintenance manager among the facility devices 21 to 23 are acquired from the operation state data, and the power consumption data on this facility device is also acquired. That is, fewer types and a smaller amount of data are acquired in the second acquisition process than those in the first acquisition process, and a shorter time and a smaller amount of processing are required for acquisition of data in the second acquisition process than those in the first acquisition process.

In the first operational process of the first control process, the data acquired in the first acquisition process is used as an operation target and a user-distribution reflected control operation is performed on all the facility devices 21 to 23. In contrast, in the second operational process of the second control process, the data acquired in the second acquisition process is used as an operation target and a user-distribution reflected control operation is performed only on the facility device that air-conditions the space designated by the user or maintenance manager among the facility devices 21 to 23. That is, fewer types and a smaller amount of data are used as an operation target in the second operational process than those in the first operational process, and a shorter time and a smaller amount of processing are required for operation of data in the second operational process than those in the first operational process.

As described above, the amount of processing required for the first control process or the second control process is determined depending on the number of facility devices to be controlled in the first control process or the second control process. The second control process is aimed at control of a smaller number of facility devices than the first control process and therefore requires a shorter time and a smaller amount of processing than the first control process.

Since the amount of processing required for the first control process is determined depending on the number of facility devices to be controlled in the first control process, the accumulated total number of facility devices (hereinafter referred to as "accumulated total number of controlled devices") controlled based on the first control process is used as an index of the usage cost of the cloud server 200 according to this embodiment. An increase in the accumulated total number of controlled devices in the first control process also increases the accumulated amount of system resources of the cloud server 200 required in the first control process, thereby increasing the usage cost of the cloud server 200.

The accumulated total number of controlled devices in the first control process is represented by the products of the numbers of facility devices controlled in accordance with the first control process and the respective control times. In an exemplary case where two facility devices are controlled based on the first control process for one hour and then one facility device is controlled based on the first control process for one hour, the accumulated total number of controlled devices is found to be the value "3" through calculation using the expression (2) below:

$$\text{Accumulated total number of controlled devices}=2\ (\text{devices})\times 1\ (\text{hour})+1\ (\text{device})\times 1\ (\text{hour})=3\ (\text{device-hours}) \quad (2)$$

The CPU 901 of the terminal 900 causes the LCD 907 to display a screen, as illustrated in FIG. 15, containing a character string representing the difference between the accumulated total number of controlled devices and the upper limit of the accumulated number. In an exemplary case where the accumulated total number of controlled devices is larger than the upper limit of the accumulated number by three, the LCD 907 displays the character string of "Excess of 3 devices". When the second control process that involves the limited-area automatic control is being executed because of the accumulated number exceeding the upper limit, the screen displayed on the LCD 907 further contains a frame surrounding only the controlled facility devices 22 and 23 among the facility devices 21 to 23. The LCD 907 also displays a character string representing that the limited-area automatic control is being executed only to the facility devices 22 and 23.

In another exemplary case where the accumulated total number of controlled devices is smaller than the upper limit of the accumulated number by three, the LCD 907 displays the character string of "3 more devices available". When the first control process that involves the whole-area automatic control is being executed because of the accumulated number below the upper limit, the screen displayed on the LCD 907 further contains a frame surrounding all the facility devices 21 to 23. The LCD 907 also displays an element representing that the whole-area automatic control is being executed to all the facility devices 22 and 23.

The terminal 900 inputs data indicating the air-conditioned space, which is designated as a target of the limited-area automatic control by the user or maintenance manager through the keyboard 908 of the terminal 900, in accordance with an operation of the user or maintenance manager, for example. The terminal 900 transmits a request that is directed to the cloud server 200, for updating of the data stored in the information storage 259 of the cloud server 200 to the input data indicating the air-conditioned space. When receiving the request, the cloud server 200 updates the data stored in the information storage 259 to the data indicating the air-conditioned space input at the terminal 900.

In this configuration, the terminal 900 displays the element representing the difference between the accumulated total number of controlled devices and the upper limit of the accumulated number. This configuration allows a user to readily understand how much amount of system resources is used to switch the control process to be executed from the first control process that involves the whole-area automatic control to the second control process that involves the limited-area automatic control. Furthermore, the terminal 900 displays the frame surrounding the facility devices 22 and 23 subject to the limited-area automatic control among the facility devices 21 to 23. This configuration also allows the user to readily notice that the control contents directed to the facility devices 22 and 23 are changed and readily understand the reason for the change.

In this configuration, the terminal 900 inputs the data indicating the air-conditioned space, which is designated as a target of the limited-area automatic control by the user or maintenance manager, and the cloud server 200 executes the limited-area automatic control to the facility device that air-conditions the space designated by the user, among the facility devices 21 to 23. This configuration can, even if the usage of the space is changed, for example, in accordance with expansion of the reception or conference room, continue the user-distribution reflected control by executing the limited-area automatic control to such space.

Embodiment 5

According to Embodiment 1, when the index of the operation cost of the control system 1 exceeds the upper limit of the index, the control process executed in the cloud server 200 is switched to the second control process, which requires a smaller amount of processing than the first control process. In contrast, according to this embodiment, the cloud server 200 executes either one of the first control process and the second control process, in which the excess of a predicted amount of decrease in the electric power cost achievable by a power saving control over a predicted amount of increase in the usage cost caused by execution of the control process is larger than that in the other control process. The following description is mainly focused on the differences of this embodiment from Embodiment 1.

The wide-area communication circuit 105c of the control device 100 illustrated in FIG. 5 downloads data indicating the weather of a region where the control system 1 is located, for example, from the website of the Meteorological Agency and transmits the downloaded data to the cloud server 200. This data is used because the weather may affect the electric power cost occurred in the facility devices 21 to 23, which are air conditioners.

Figure 20:
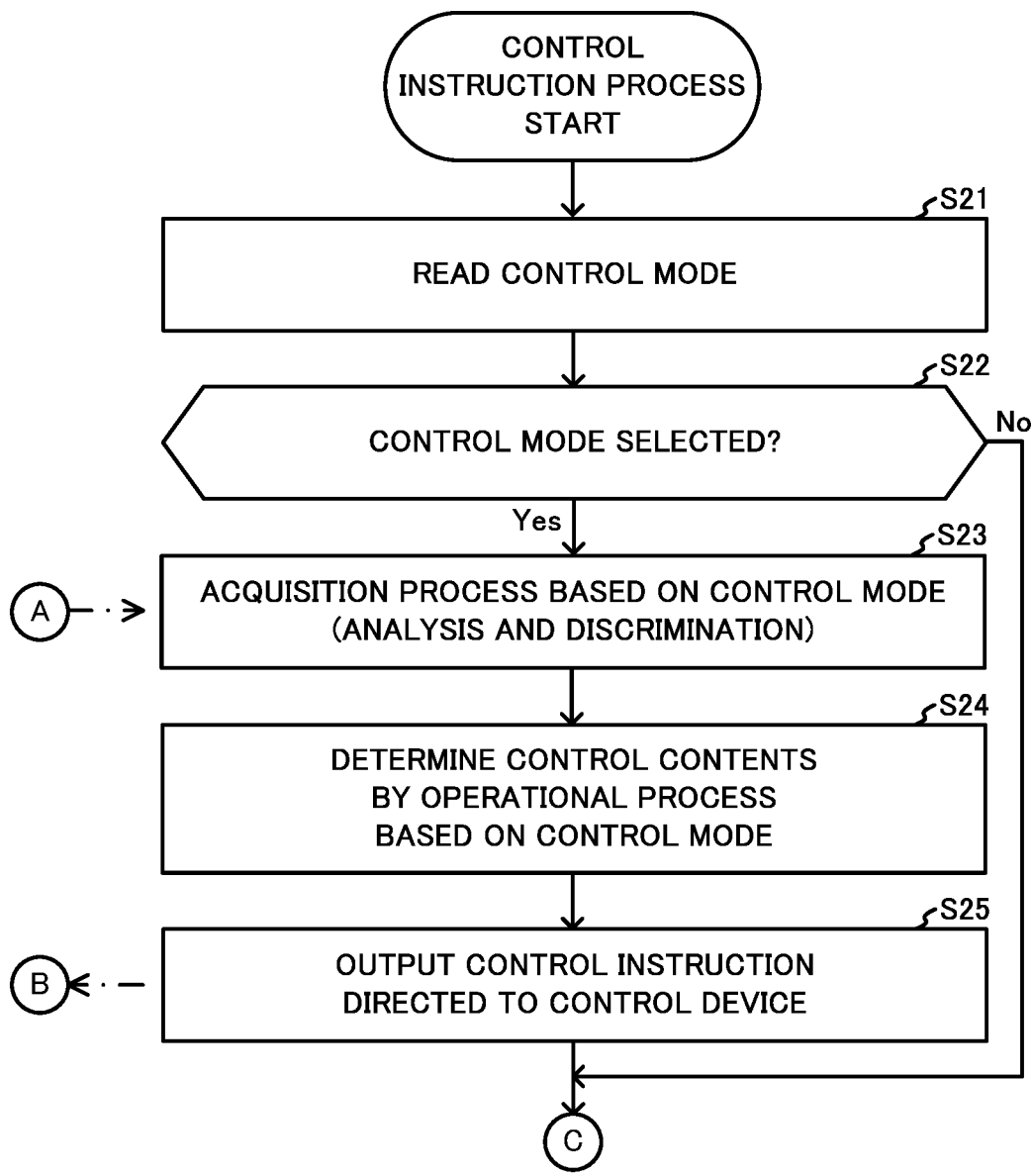
FIG. 20 is a flowchart illustrating the first half of an exemplary control instruction process executed by a server according to Embodiment 5.
Figure 21:
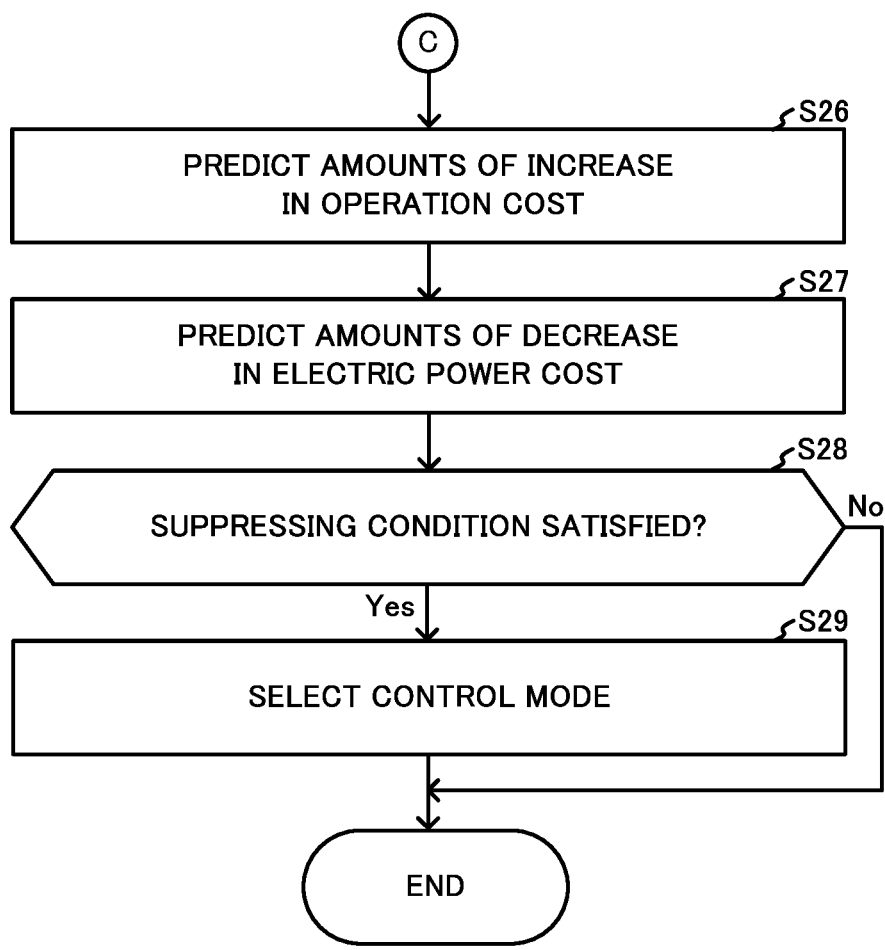
FIG. 21 is a flowchart illustrating the second half of the exemplary control instruction process executed by the server according to Embodiment 5.

The CPU 211 of the server 210, which functions as the cloud server 200, executes a control instruction process illustrated in FIGS. 20 and 21. The CPU 211 of the server 210 thus functions as a predictor 254 illustrated in FIG. 22. The predictor 254 predicts an amount of decrease in the electric power cost achievable by the power saving control of the facility devices 21 to 23 in accordance with each of the first control process and the second control process, and an amount of increase in the usage cost caused by execution of each of the first control process and the second control process.

Figure 22:
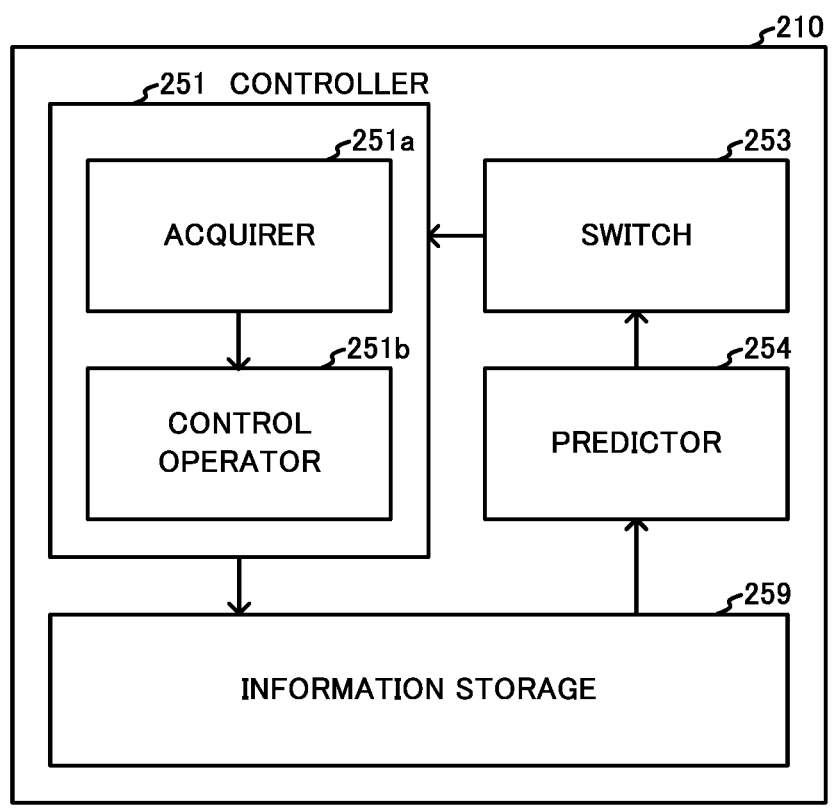
FIG. 22 is a functional block diagram illustrating exemplary functions of a control device according to Embodiment 5.

The information storage 259 illustrated in FIG. 22 stores data to be applied to prediction of the amounts of increase in the usage cost and the amounts of decrease in the electric power cost. This data for prediction contains information on correspondence between the process ID for identifying the first control process, data indicating a test time when the control based on the first control process was tested to the facility devices 21 to 23, and data indicating the weather and season of a test day. This data is used because the time, weather, and season significantly vary depending on the electric power cost.

The data for prediction also contains data indicating an amount of increase in the usage cost of the cloud server 200 caused by the test execution of the first control process, in association with the process ID of the first control process, the data indicating the test time, and the data indicating the weather and season of the test day. The data for prediction further contains data indicating an amount of decrease in the electric power cost in the facility devices 21 to 23 caused by the test execution of the first control process, in association with the process ID of the first control process, the data indicating the test time, and the data indicating the weather and season of the test day.

In addition, the data for prediction contains information on correspondence between the process ID of the second control process, data indicating the test time, data indicating the weather and season of the test day, data indicating an amount of increase in the usage cost caused by the test execution of the second control process, and data indicating an amount of decrease in the electric power cost.

The information storage 259 stores a variable representing that the first control mode is selected, the second control mode is selected, or neither of the control modes is selected, as the control mode of the controller 251. This variable is set to a value representing that neither of the control modes is selected in the initial state.

At the start of the control instruction process illustrated in FIG. 20, the controller 251 reads a variable representing the selected control mode from the information storage 259 (Step S21). The controller 251 then determines whether any control mode is selected, based on the read variable (Step S22). When determining that any control mode is selected (Step S22; Yes), the controller 251 executes the steps identical to Steps S12 to S14 illustrated in FIG. 10 in accordance with the selected control mode (Steps S23 to S25). Accordingly, the state of either one of the first control process and the second control process, which is selected at the same time as the selection of the control mode, is switched to an execution state, followed by determination of a control instruction and output of the control instruction to the facility devices 21 to 23.

When the external communication circuit 215 illustrated in FIG. 9 receives data indicating the current weather from the control device 100 illustrated in FIG. 1, the predictor 254 illustrated in FIG. 22 acquires the data from the external communication circuit 215. The predictor 254 then refers to, for example, the system date and time of the operating system (OS) and specifies the present time and season.

The predictor 254 then acquires data indicating the amount of increase in the usage cost associated with the process ID of the first control process, and with the data indicating the test time, weather, and season of a test day identical or similar to the present time, weather, and season, from the information storage 259 illustrated in FIG. 22. The predictor 254 regards the amount of increase indicated by the acquired data as a predicted amount of increase in the usage cost caused by execution of the first control process. The predictor 254 also predicts an amount of increase in the usage cost caused by execution of the second control process in the same manner (Step S26).

The predictor 254 further acquires data indicating an amount of decrease in the electric power cost in the test execution from the information storage 259, based on the process ID of the first control process, the present time, weather, and season. The predictor 254 then regards the amount of decrease indicated by the acquired data as a predicted amount of decrease in the electric power cost achievable by execution of the first control process. The predictor 254 also predicts an amount of decrease in the electric power cost achievable by execution of the second control process in the same manner (Step S27).

The switch 253 illustrated in FIG. 22 then determines whether or not the predicted amount of decrease in the electric power cost achievable by execution of the first control process is larger than the predicted amount of increase in the usage cost, and whether or not the predicted amount of decrease in the electric power cost achievable by execution of the second control process is larger than the predicted amount of increase in the usage cost. When determining that the predicted amount of decrease in the electric power cost achievable by execution of the first control process is larger than the predicted amount of increase in the usage cost, or when determining that the predicted amount of decrease achievable by execution of the second control process is larger than the predicted amount of increase, or when determining both, then the switch 253 determines that the suppressing condition for suppressing an increase in the operation cost is satisfied (Step S28; Yes). The operation cost is composed of the electric power cost and the usage cost of the cloud server 200.

The switch 253 then selects a control mode for executing either one of the first control process and the second control process, in which the excess of the predicted amount of decrease over the predicted amount of increase is larger than that in the other control process (Step S29). The switch 253 updates the variable stored in the information storage 259 to the value representing the selected control mode, and then terminates the control instruction process. Accordingly, in the subsequent control instruction process, the state of one of the control processes, in which the excess of the predicted amount of decrease over the predicted amount of increase is larger than that in the other control process, is switched to an execution state in accordance with the selected control mode, in Steps S23 and S24.

In Step S28, when the switch 253 determines that the predicted amount of decrease in the cost achievable by execution of the first control process is smaller than the predicted amount of increase and when the predicted amount of decrease in the cost achievable by execution of the second control process is smaller than the predicted amount of increase, the switch 253 determines that the suppressing condition is not satisfied (Step S28; No). In this case, the increase in the operation cost cannot be suppressed.

The switch 253 updates the variable stored in the information storage 259 to the value representing that neither of the control modes is selected, and then terminates the control instruction process. Accordingly, in the subsequent control instruction process, it is determined that neither of the control modes is selected based on the variable stored in the information storage 259 in Step S22 (Step S22; No). The processes in Steps S23 to S25 are skipped and the process in Step S26 is proceeded, so that neither of the first control process and the second control process is executed.

In this configuration, the switch 253 performs a control to switch the state of either one of the first control process and the second control process, which is selected based on the predicted amounts of decrease in the electric power cost achievable by control of the facility devices 21 to 23 and based on the predicted amounts of increase in the usage cost of the control system 1, to an execution state. The operation cost of the control system 1 is composed of the electric power cost occurred in the facility devices 21 to 23 and the usage cost of the cloud server 200. This configuration can more certainly suppress an increase in the operation cost in comparison to a conventional configuration, even when the amounts of decrease in the electric power cost achievable by execution of the first control process and the second control process and the amounts of increase in the usage cost of the cloud server 200 vary depending on the weather or season, for example.

Although the first control process and the second control process having more complicated steps can further decrease the electric power cost, these processes require a larger amount of processing, resulting in an excessive increase in the usage cost of the cloud server 200. Even in this case, the configuration can more certainly suppress an increase in the operation cost in comparison to a conventional configuration, in view of a trade-off between the amounts of decrease in the electric power cost and the amounts of increase in the usage cost.

In this configuration, the switch 253 performs a control to switch the state of either one of the first control process and the second control process, in which the excess of the predicted amount of decrease over the predicted amount of increase is larger than that in the other control process, to an execution state. This configuration enables execution of a process that can more effectively suppress the increase in the operation cost than the other control process of the first control process and the second control process.

In this configuration, the switch 253 performs a control to maintain the stop states of the first control process and the second control process in the case where the predicted amount of decrease is smaller than the predicted amount of increase in each of the first control process and the second control process. This configuration can more certainly suppress an increase in the operation cost.

Modification 1 of Embodiment 5

According to Embodiment 5, the amounts of increase in the usage cost caused by execution of the first control process and the second control process are predicted based on the amounts of increase in the usage cost obtained by test execution of the first control process and the second control process. This configuration, however, should not be construed as limiting the disclosure. The amounts of increase in the usage cost caused by execution of the first control process and the second control process may be predicted based on the amounts of required processing specified using the source codes of the first control process and the second control process, for example.

Modification 2 of Embodiment 5

According to Embodiment 5, the switch 253 performs a control to switch the state of either one of the first control process and the second control process, in which the excess of the predicted amount of decrease over the predicted amount of increase is larger than that in the other control process, to an execution state. This configuration, however, should not be construed as limiting the disclosure. When parallel execution of the first control process and the second control process is available and when the predicted amount of decrease is larger than the predicted amount of increase in each of the first control process and the second control process, the states of both of the first control process and the second control process may be switched to an execution state. For example, the first control process may be a process for reducing the electric power cost by turning off the facility device that air-conditions the space designated by the user or maintenance manager when no user is detected in the space. The second control process may be a process for reducing the electric power cost by increasing or decreasing the target temperatures of all the facility devices 21 to 23 by a certain temperature. These first and second control processes may be executed in parallel.

Embodiment 6

According to Embodiment 1, the server 200, which functions as the cloud server 200, varies the types of data acquired from the collected data received by the external communication circuit 215 illustrated in FIG. 9 in accordance with the control mode, in Step S12 illustrated in FIG. 10. This configuration, however, should not be construed as limiting the disclosure. According to this embodiment, the control device 100 varies the types of collected data to be transmitted to the cloud server 200, while the cloud server 200 switches the control mode based on the types of the collected data received from the control device 100. The following description is mainly focused on the differences of this embodiment from Embodiment 1.

Figure 23:
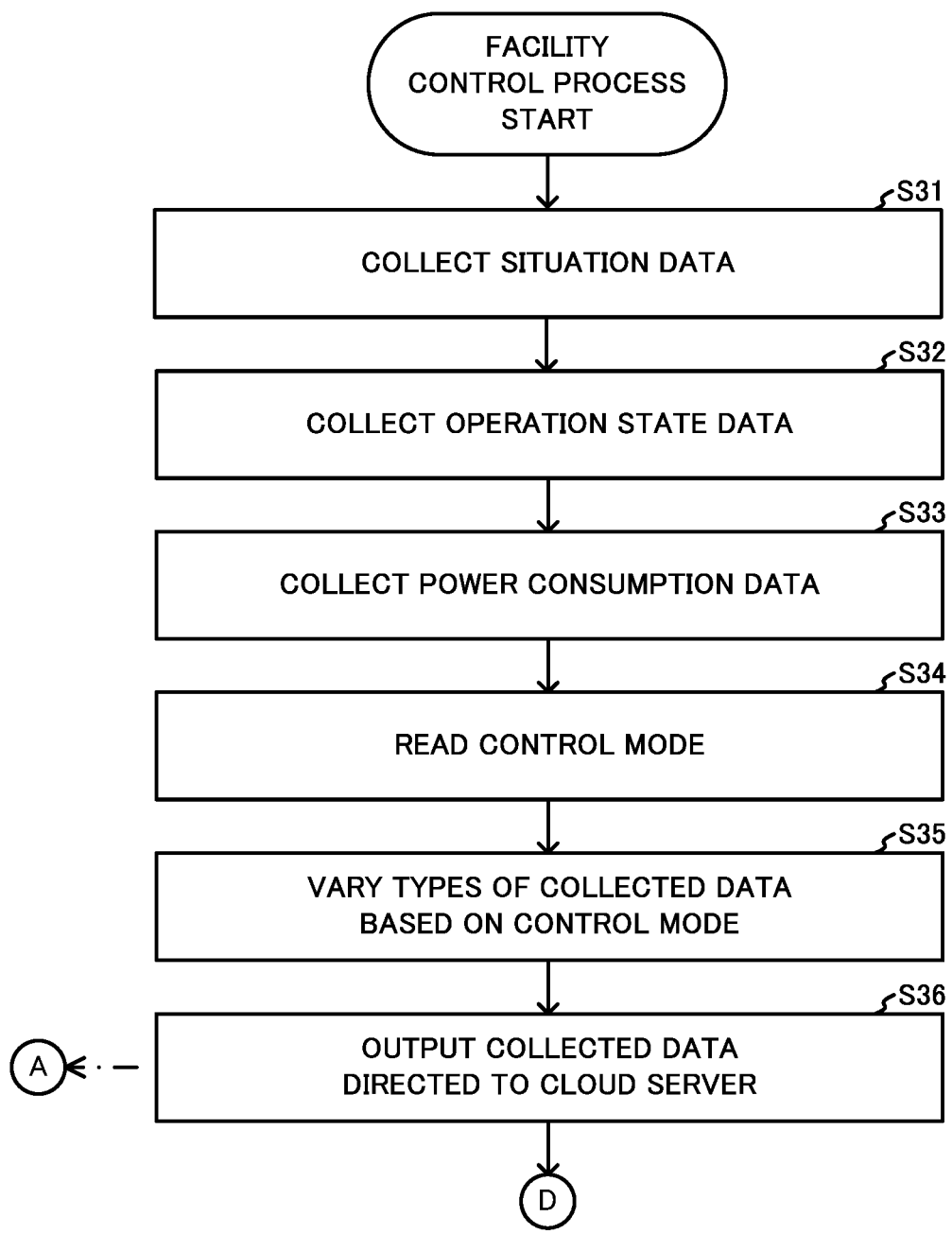
FIG. 23 is a flowchart illustrating the first half of an exemplary facility control process executed by a control device according to Embodiment 6.
Figure 24:
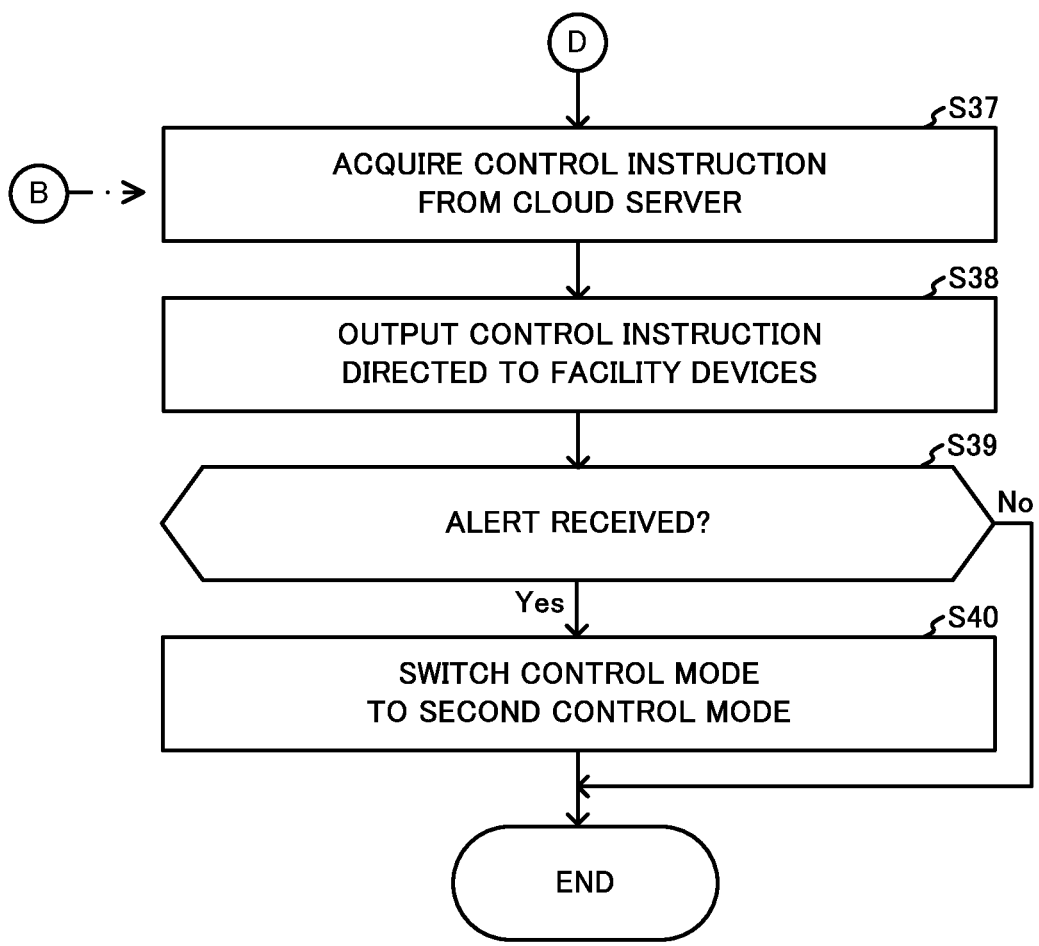
FIG. 24 is a flowchart illustrating the second half of the exemplary facility control process executed by the control device according to Embodiment 6.
Figure 25:
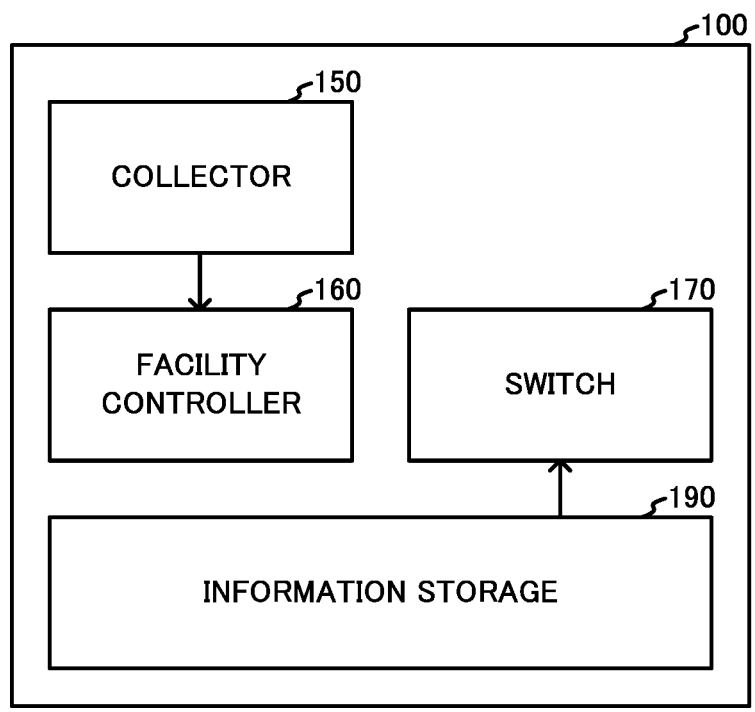
FIG. 25 is a functional block diagram illustrating exemplary functions of the control device according to Embodiment 6.

The CPU 101 of the control device 100 according to this embodiment executes a facility control process illustrated in FIGS. 23 and 24, so that the wide-area communication circuit 105c illustrated in FIG. 5 serves as a switch 170 illustrated in FIG. 25 for switching the types of collected data to be transmitted to the cloud server 200. The switch 170 is an example of switching means included in the control device according to the disclosure.

The hard disk 104 of the control device 100 serves as an information storage 190 for storing a flag representing the control mode. The flag representing the control mode is set to represent the first control mode in the initial state.

At the start of the facility control process illustrated in FIG. 23, the steps identical to Steps SO1 to S03 illustrated in FIG. 6 are executed (Steps S31 to S33), so as to collect data that contains the situation data, the operation state data, and the power consumption data.

The switch 170 then reads the flag representing the control mode from the information storage 190 (Step S34), and varies the types of data contained in the collected data based on the control mode represented by the read flag. In the initial state, in accordance with the first control mode represented by the flag, the switch 170 modifies the collected data such that the collected data contains only the types of data subject to the control operation included in the first operational process of the first control process (Step S35).

The switch 170 then outputs to the wide-area communication circuit 105c illustrated in FIG. 5 the collected data that is directed to the cloud server 200 (Step S36).

Then, the steps identical to Steps S05 and S06 illustrated in FIG. 6 are executed (Step S37 and S38), so that the control instruction determined by the cloud server 200 is output and then is directed to the facility devices 21 to 23.

The switch 170 determines whether or not the wide-area communication circuit 105c illustrated in FIG. 5 receives an alert transmitted, when the suppressing condition is satisfied, from the cloud server 200 (Step S39). When determining that no alert is received (Step S39; No), the switch 170 terminates the facility control process.

In contrast, when determining that the alert is received (Step S39; Yes), the switch 170 switches the control mode from the first control mode to the second control mode (Step S40), updates the flag stored in the information storage 190 to the flag representing the second control mode, and then terminates the facility control process.

In the subsequent facility control process, the switch 170 modifies the collected data such that the collected data contains only the types of data subject to the operation in the second operational process in Step S35, and then outputs to the wide-area communication circuit 105c illustrated in FIG. 5 the collected data that is directed to the cloud server 200 in Step S36. The switch 170 thus performs a control to vary the types of the collected data to be transmitted to the cloud server 200 from the types of data subject to the operation in the first operational process to the types of data subject to the operation in the second operational process, the control being directed to the wide-area communication circuit 105c.

Figure 26:
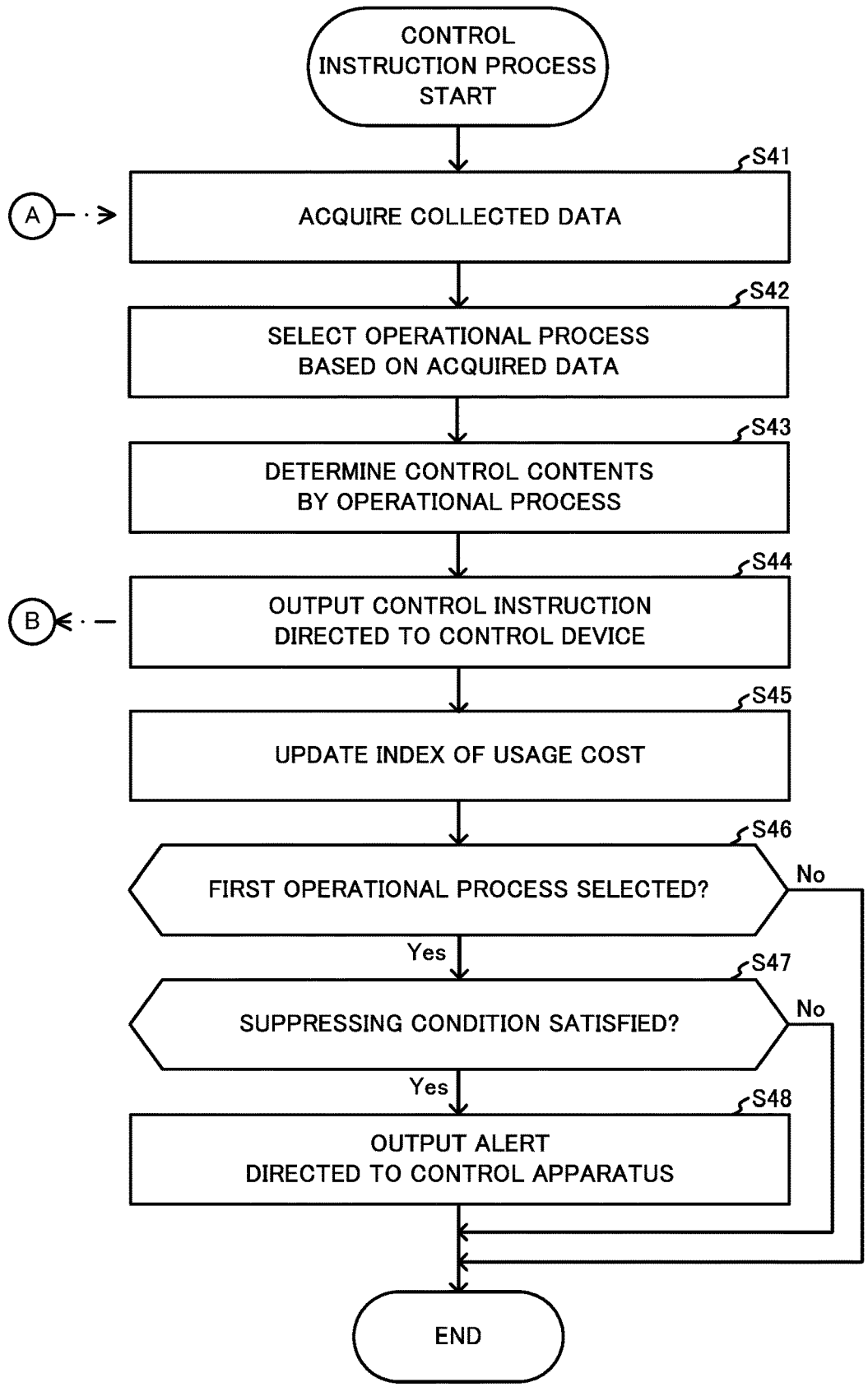
FIG. 26 is a flowchart illustrating an exemplary control instruction process executed by a server according to Embodiment 6.
Figure 27:
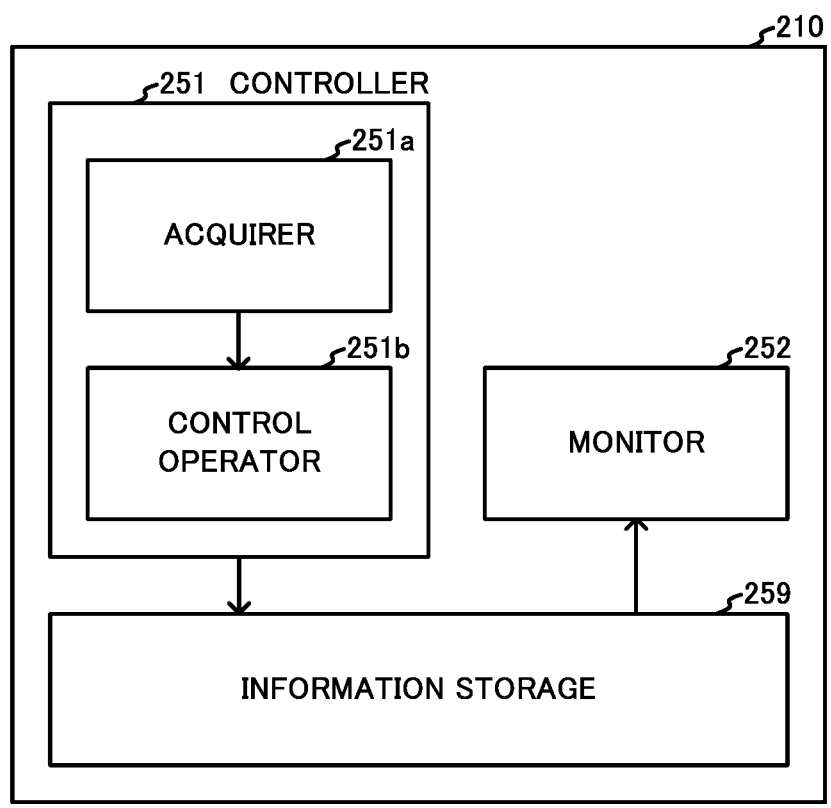
FIG. 27 is a functional block diagram illustrating exemplary functions of the server according to Embodiment 6.

The CPU 211 of the server 210, which functions as the cloud server 200, executes a control instruction process illustrated in FIG. 26 and thereby serving as the controller 251 and the monitor 252 illustrated in FIG. 27, but not serving as the switch 253 illustrated in FIG. 11. The switching of the control mode is performed by the switch 170 of the control device 100 illustrated in FIG. 25.

At the start of the control instruction process illustrated in FIG. 26, the acquirer 251a illustrated in FIG. 27 acquires all the collected data received by the external communication circuit 215 illustrated in FIG. 9 without any analysis or discrimination (Step S41). No analysis or discrimination is needed because the control device 100 transmits only the types of data required for the first operational process of the first control process or the second operational process of the second control process.

The control operator 251b then selects either one of the first operational process and the second operational process, in which the collected data acquired by the acquirer 251a contains a complete set of data subject to the control operation and which requires a larger amount of data subject to the control operation than that in the other operational process (Step S42). That is, in the case where the control device 100 transmits only the data subject to the control operation in the first control process, the first operational process included in the first control process is selected. In contrast, in the case where the control device 100 transmits only the data subject to the control operation in the second control process, the second operational process is selected.

The steps identical to Steps S14 and S15 illustrated in FIG. 10 are then executed (Steps S43-S45), so as to output the control instruction determined by execution of the selected operational process.

The monitor 252 then determines whether or not the operational process selected in Step S42 is the first operational process (Step S46). When determining that the first operational process is selected (Step S46; Yes), the monitor 252 executes the step identical to Step S17 illustrated in FIG. 10 and thereby determining whether the suppressing condition is satisfied (Step S47).

When determining that the suppressing condition is satisfied (Step S47; Yes), the monitor 252 outputs to the external communication circuit 215 illustrated in FIG. 9 with an alert that is directed to the control device 100 (Step S48). This step is aimed at informing the control device 100 of satisfaction of the suppressing condition. The external communication circuit 215 transmits the alert to the control device 100, and the monitor 252 then terminates the control instruction process.

When the monitor 252 determines that not the first operational process but the second operational process is selected in Step S46 (Step S46; No), or when the monitor 252 determines that the suppressing condition is not satisfied in Step S47 (Step S47; No), then the monitor 252 terminates the control instruction process.

In this configuration, when the suppressing condition is satisfied, the switch 170 of the control device 100 performs a control to vary the types of collected data to be transmitted to the cloud server 200 from the types of data subject to the operation in the first control process to the types of data subject to the operation in the second control process. This configuration can suppress the control device 100 from transmitting data that will not be acquired for execution of the second control process in the cloud server 200, thereby suppressing the amount of data received by the cloud server 200. The configuration can also suppress an increase in the usage cost in the case where the usage cost of the cloud server 200 is determined based on the amount of data received by the cloud server 200.

Modification of Embodiment 6

According to Embodiment 6, the control device 100 performs the control to vary the types of collected data to be transmitted to the cloud server 200 from the types of data subject to the operation in the first control process to the types of data subject to the operation in the second control process, in response to satisfaction of the suppressing condition. In this configuration, the amount of data subject to the operation in the second control process is smaller than the amount of data subject to the operation in the first control process. This configuration, however, should not be construed as limiting the disclosure. The control device 100 may stop transmission of the collected data to the cloud server 200 in response to satisfaction of the suppressing condition.

Embodiments 1 to 6, Modifications 1 to 7 of Embodiment 1, Modifications 1 and 2 of Embodiment 5, and the modification of Embodiment 6 of the disclosure may be combined with one another.

The control system 1 according to any of Embodiments 1 to 6, Modifications 1 to 7 of Embodiment 1, Modifications 1 and 2 of Embodiment 5, and the modification of Embodiment 6 of the disclosure may be equipped with the control device 100, the cloud server 200, and the terminal 900 in the form of individual or integrated elements.

The control device 100, the cloud server 200, and the terminal 900 may be configured in advance to perform the functions according to any of Embodiments 1 to 6, Modifications 1 to 7 of Embodiment 1, Modifications 1 and 2 of Embodiment 5, and the modification of Embodiment 6 of the disclosure. A program may be applied to cause an existing control device 100, cloud server 200, and terminal 900 to function as the control device 100, the cloud server 200, and the terminal 900 according to any of Embodiments 1 to 6, Modifications 1 to 7 of Embodiment 1, Modifications 1 and 2 of Embodiment 5, and the modification of Embodiment 6. That is, a program for achieving the functional configurations of the control device 100, the cloud server 200, and the terminal 900 according to any of Embodiments 1 to 6, Modifications 1 to 7 of Embodiment 1, Modifications 1 and 2 of Embodiment 5, and the modification of Embodiment 6 may be executed by a computer (for example, a CPU) that controls an existing control device 100, cloud server 200, and terminal 900, so that these components can function as the control device 100, the cloud server 200, and the terminal 900 according to any of Embodiments 1 to 6, Modifications 1 to 7 of Embodiment 1, Modifications 1 and 2 of Embodiment 5, and the modification of Embodiment 6.

This program may be distributed in any procedure. For example, the program may be distributed in the form of being stored in a non-transitory recording medium, such as a memory card, a compact disc read only memory (CD-ROM), or a digital versatile disk read only memory (DVD-ROM), or may be distributed via a communication medium, such as the Internet. It should be noted that the control method can be performed using the control system 1.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The disclosure is suitable for a control system for controlling facility devices.

REFERENCE SIGNS LIST

1 Control system
11 Situation collecting system
12 Power consumption collecting system
21-23 Facility device
21a, 101, 116a, 119a, 129a, 211, 290a, 901 CPU
21b, 102, 116b, 119b, 129b, 212, 290b, 902 ROM
21c, 103, 116c, 119c, 129c, 213, 290c, 903 RANI
21d, 116d Flash memory
21f, 111f, 116f, 119f, 129f Communication circuit
21g, 21h Thermometer
21i Compressor
21j Motor
100 Control device
104, 119d, 129d, 214, 290d, 904 Hard disk
105a, 215, 290f External communication circuit
105b Air-conditioner communication circuit
105c, 290g, 905 Wide-area communication circuit
106, 216, 906 Video card
107, 217, 907 LCD
108, 218, 908 Keyboard
111-113 Imaging device
111a Image sensor
111b Image generating circuit
116, 117 Mobile terminal
116e Touch panel
119 Situation collecting device
121-123 Ammeter
126-128 Voltmeter
129 Power consumption collecting device
150 Collector
160 Facility controller
170, 253 Switch
190, 259 Information storage
200 Cloud server
210-230 Server
251 Controller
251a Acquirer
251b Control operator
252 Monitor
254 Predictor
290 Scale controller
900 Terminal
N1 Local network
N2 Air-conditioner network
N3 Public network

The invention claimed is:

1. A control system configured to control a facility device, the control system comprising:
a controller configured to execute, in a cloud server,
a first control process including an acquisition process for acquiring data indicating a state of the facility device, and an operational process for performing an operation for controlling the state of the facility device based on the data acquired in the acquisition process, and
a second control process including the acquisition process and the operational process, wherein an amount of processing necessary for execution of the second control process is less than that of the first control process; and a switch configured to perform, when a condition for suppressing an increase in an operation cost of the control system including a usage cost of the cloud server and an electric power cost of the facility device is satisfied, one control of
a control to maintain a stop state of the first control process or switch a state of the first control process to the stop state, and switch a state of the second control process to an execution state, and
a control to switch a state of at least one control process to the execution state, the at least one control process being selected from the first control process and the second control process based on predicted amounts of decrease in the electric power cost achievable by control of the facility device and predicted amounts of increase in the usage cost,
wherein
the switch is configured to perform a control to vary a type of the data transmitted to the cloud server from a control device, the data indicating the state of the facility device, when the condition is satisfied,
a type of the data operated in the operational process included in the first control process is different from a type of the data operated in the operational process included in the second control process, and
the controller is configured to execute a control process, the control process being selected from the first control process and the second control process based on the type of the data received from the control device by the cloud server.

2. The control system according to claim 1, further comprising:
the control device comprising:
a collector configured to collect the data indicating the state of the facility device;
a communicator configured to transmit the data collected by the collector to the cloud server; and
the switch, wherein
the cloud server comprises:
a communicator configured to receive the data transmitted from the communicator of the control device; and
the controller.

3. The control system according to claim 1, wherein
the condition is satisfied when an index of the usage cost of the cloud server exceeds an upper limit predetermined for the index, the usage cost being determined or predicted based on an accumulated amount of processing executed in the cloud server, and
the switch is configured to perform a control to switch a control process executed by the controller in the cloud server, from the first control process to the second control process, when the condition is satisfied.

4. The control system according to claim 3, wherein
the amount of processing necessary for execution of the first control process is determined depending on a number of users staying in a space in which the facility device is disposed,
the index is an accumulated total number of users in the space, and
the control system further comprises a display configured to display a difference between the accumulated total number of users and the upper limit, and whether the control process executed by the controller is the first control process executed before excess of the accumulated total number over the upper limit or the second control process executed after the excess of the accumulated total number over the upper limit.

5. The control system according to claim 3, wherein
the first control process and the second control process reduce an electric power consumption of the facility device,
the index is an accumulated number of days of execution of the first control process, and
the control system further comprises a display configured to display a difference between the accumulated number of days and the upper limit, and whether the control process executed by the controller is the first control process executed before excess of the accumulated number over the upper limit or the second control process executed after the excess of the accumulated number over the upper limit.

6. The control system according to claim 3, wherein
the amount of processing necessary for execution of the first control process is determined depending on a number of facility devices to be controlled,
the index is an accumulated total number of facility devices controlled based on the first control process, and
the control system further comprises a display configured to display a difference between the accumulated total number of facility devices and the upper limit, and the facility devices controlled based on the first control process or the second control process.

7. A control system configured to control a facility device, the control system comprising:
a controller configured to execute, in a cloud server,
a first control process including an acquisition process for acquiring data indicating a state of the facility device, and an operational process for performing an operation for controlling the state of the facility device based on the data acquired in the acquisition process, and
a second control process including the acquisition process and the operational process, wherein an amount of processing necessary for execution of the second control process is less than that of the first control process; and
a switch configured to perform, when a condition for suppressing an increase in an operation cost of the control system including a usage cost of the cloud server and an electric power cost of the facility device is satisfied,
a control to switch a state of at least one control process to an execution state, the at least one control process being selected from the first control process and the second control process based on predicted amounts of decrease in the electric power cost achievable by control of the facility device and predicted amounts of increase in the usage cost, wherein
the condition is satisfied in a first case in which the predicted amount of decrease in the electric power cost achievable by execution of the first control process is larger than the predicted amount of increase in the usage cost, or in a second case in which the predicted amount of decrease achievable by execution of the second control process is larger than the predicted amount of increase, or both, and
the switch is configured to perform the control to switch the state of the at least one control process selected from the first control process and the second control process to the execution state, the selected at least one control process providing an excess of the predicted amount of decrease over the predicted amount of increase.

8. The control system according to claim 7, wherein the switch is configured to perform, when the condition is satisfied,
selection of the first control process in a case that is the first case and is not the second case,
selection of the second control process in a case that is not the first case and is the second case,
in a case that is the first case and the second case, one selection of
selection of the first control process and the second control process, and
selection of a control process from the first control process and the second control process, the selected control process providing a larger excess of the predicted amount of decrease over the predicted amount of increase than that of the other control process, and
the control to switch the state of the at least one selected process to the execution state.

9. A control method executed by a control system configured to control a facility device, the method comprising:
executing, in a cloud server included in the control system,
a first control process including an acquisition process for acquiring data indicating a state of the facility device, and an operational process for performing an operation for controlling the state of the facility device based on the data acquired in the acquisition process, and
a second control process including the acquisition process and the operational process, wherein an amount of processing necessary for execution of the second control process is less than that of the first control process; and
performing, when a condition for suppressing an increase in an operation cost of the control system including a usage cost of the cloud server and an electric power cost of the facility device is satisfied, to the cloud server, one control of
a control to maintain a stop state of the first control process or switch a state of the first control process to the stop state, and switch a state of the second control process to an execution state, and
a control to switch a state of at least one control process to the execution state, the at least one control process being selected from the first control process and the second control process based on predicted amounts of decrease in the electric power cost achievable by control of the facility device and predicted amounts of increase in the usage cost, wherein
the performing includes performing a control to vary a type of the data transmitted to the cloud server from a control device, the data indicating the state of the facility device, when the condition is satisfied,
a type of the data operated in the operational process included in the first control process is different from a type of the data operated in the operational process included in the second control process, and
the executing includes executing a control process, the control process being selected from the first control process and the second control process based on the type of the data received from the control device by the cloud server.

10. A computer-readable non-transitory recording medium storing a program causing a computer of a control device included in a control system configured to control a facility device, to function as a switch, wherein
    the control system includes a cloud server including a controller configured to execute
        a first control process including an acquisition process for acquiring data indicating a state of the facility device, and an operational process for performing an operation for controlling the state of the facility device based on the data acquired in the acquisition process, and
        a second control process including the acquisition process and the operational process, wherein an amount of processing necessary for execution of the second control process is less than that of the first control process,
    the switch of the control device is configured to perform, when a condition for suppressing an increase in an operation cost of the control system including a usage cost of the cloud server and an electric power cost of the facility device is satisfied, one control of
        a control to maintain a stop state of the first control process or switch a state of the first control process to the stop state, and switch a state of the second control process to an execution state, and
        a control to switch a state of at least one control process to the execution state, the at least one control process being selected from the first control process and the second control process based on predicted amounts of decrease in the electric power cost achievable by control of the facility device and predicted amounts of increase in the usage cost,
    a type of the data operated in the operational process included in the first control process is different from a type of the data operated in the operational process included in the second control process,
    the controller of the cloud server is configured to execute a control process, the control process being selected from the first control process and the second control process based on a type of the data received from the control device by the cloud server, and
    the switch of the control device is configured to perform a control to vary the type of the data transmitted to the cloud server from the control device, the data indicating the state of the facility device, when the condition is satisfied.

* * * * *